US011934137B2

(12) United States Patent
Nagamine

(10) Patent No.: US 11,934,137 B2
(45) Date of Patent: Mar. 19, 2024

(54) IMAGE FORMING APPARATUS

(71) Applicant: CANON KABUSHIKI KAISHA, Tokyo (JP)

(72) Inventor: Shogo Nagamine, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/160,763

(22) Filed: Jan. 27, 2023

(65) Prior Publication Data

US 2023/0251599 A1 Aug. 10, 2023

(30) Foreign Application Priority Data

Feb. 4, 2022 (JP) ................................ 2022-016353
Nov. 22, 2022 (JP) ................................ 2022-186222

(51) Int. Cl.
*G03G 15/00* (2006.01)

(52) U.S. Cl.
CPC ................................ *G03G 15/757* (2013.01)

(58) Field of Classification Search
CPC ............ G03G 15/757; G03G 15/1685; G03G 2221/1657; G03G 21/1647
See application file for complete search history.

(56) References Cited

U.S. PATENT DOCUMENTS

| | | | | |
|---|---|---|---|---|
| 2009/0208242 A1* | 8/2009 | Hayakawa | G03G 15/6561 | 399/388 |
| 2013/0101314 A1* | 4/2013 | Yasuda | G03G 15/757 | 399/167 |
| 2015/0108715 A1* | 4/2015 | Yamada | G03G 21/1647 | 74/52 |
| 2017/0152116 A1* | 6/2017 | Hashimoto | G03G 15/6511 | |
| 2017/0267473 A1* | 9/2017 | Watanabe | G03G 21/1647 | |
| 2020/0103006 A1* | 4/2020 | Tomatsu | G03G 15/06 | |
| 2021/0200135 A1* | 7/2021 | Ikegami | G03G 15/346 | |

FOREIGN PATENT DOCUMENTS

| | | |
|---|---|---|
| JP | 2015166600 A | 9/2015 |
| JP | 2016175217 A | 10/2016 |

* cited by examiner

*Primary Examiner* — Francis C Gray
(74) *Attorney, Agent, or Firm* — ROSSI, KIMMS & McDOWELL LLP

(57) ABSTRACT

An image forming apparatus including: a restricting member; a driven gear including a portion to be restricted; a planetary gear mechanism including input portion to transmit a driving force from a driving source, output portion for transmitting the driving force to the driven gear; and a stopping member that is configured to stop rotation, which is oriented in a first rotation direction, and allow rotation of the portion to be stopped in a second rotation direction opposite to the first rotation direction, wherein when the input portion rotates in a first direction, the stopping member stops the rotation, and the output portion rotates the driven gear in a release direction opposite to the restriction direction, and when the rotation of the driven gear in the restriction direction is restricted and the input portion rotates to be oriented in a second direction opposite to the first direction.

19 Claims, 18 Drawing Sheets

IMAGE FORMING APPARATUS

BACKGROUND OF THE INVENTION

Field of the Invention

The present invention relates to an image forming apparatus.

Description of the Related Art

In an image forming apparatus of an electrographic system or the like, a photosensitive drum, a conveying roller, and the like are driven by a motor. A driving force is transmitted from the motor to an object to be driven through a drivetrain such as gears and belts. Here, when the object to be driven or one of elements included in the drivetrain is rotated by an external force, other elements to which the drivetrain is linked also rotate together. For example, when a rotating body for which rotation in one direction is restricted is present in the drivetrain and the rotating body receives a rotational force in the restricted direction due to an external force, the drivetrain, a shaft supporting the drivetrain, and the like may be damaged by a load applied thereto.

Japanese Patent Application Publication No. 2016-175217 discloses a configuration in which the rigidity of a support portion of a driving member is lowered, and where a predetermined torque is applied, the support portion flexes and tooth skipping occurs, thereby preventing damage. However, in the method of Japanese Patent Application Publication No. 2016-175217, the support portion can be flexed even during normal use of the apparatus, so there is a risk that the strength of the drivetrain will be reduced.

With the foregoing in view, there is a need for an image forming apparatus equipped with a drivetrain including a rotating body for which rotation is restricted, the apparatus having a novel configuration for preventing the drivetrain from damage even when a rotational force is further applied in the restricted direction.

The present invention has been created in view of the above problems, and an object of the present invention is to provide an image forming apparatus equipped with a drivetrain including a rotating body for which rotation is restricted such that damage to the drivetrain is prevented.

SUMMARY OF THE INVENTION

The present invention provides an image forming apparatus forming an image on a recording material, the image forming apparatus comprising:

a restricting member;

a driven gear that includes a portion to be restricted capable of coming into contact with the restricting member, wherein rotation of the driven gear in a restriction direction is restricted when the portion to be restricted is in contact with the restricting member;

a planetary gear mechanism that includes an input portion configured to receive a driving force transmitted from a driving source, an output portion configured to transmit the driving force to the driven gear, and a portion to be stopped; and a stopping member that is configured to stop rotation of the portion to be stopped in a first rotation direction, and allow rotation of the portion to be stopped in a second rotation direction opposite to the first rotation direction, wherein when the input portion rotates in a first direction, the stopping member stops rotation of the portion to be stopped in the first rotation direction, and the output portion rotates the driven gear in a release direction opposite to the restriction direction, and when the rotation of the driven gear in the restriction direction is restricted and the input portion rotates in a second direction opposite to the first direction, the portion to be stopped rotates in the second rotation direction.

Further features of the present invention will become apparent from the following description of exemplary embodiments with reference to the attached drawings.

DESCRIPTION OF THE EMBODIMENTS

Preferred embodiments of the present invention will be exemplarily described in detail hereinbelow with reference to the drawings. However, the dimensions, materials, shapes, and relative positions of components described in the following embodiments should be changed, as appropriate, according to the configuration of the apparatus to which the present invention is to be applied and various conditions. Therefore, this description is not intended to limit the scope of the invention unless specifically stated otherwise.

Embodiment 1

Schematic Configuration of Image Forming Apparatus

An image forming apparatus equipped with a mechanism for preventing damage during reverse rotation of a drivetrain according to the Embodiment 1 will be described with reference to FIG. 1. In the present embodiment, a laser beam printer is exemplified as the image forming apparatus, and a case where a mechanism for preventing damage during reverse rotation of a drivetrain is applied a separation portion of a transfer roller that transfers toner onto paper will be described. The mechanism for preventing damage during reverse rotation of the drivetrain according to the present invention is configured to use a planetary gear mechanism to prevent rotation, without reducing the strength of the drivetrain, against input in the direction in which rotation is restricted, and this technique can be applied to an object to be driven for which rotation in a certain direction is restricted. The application range thereof is not particularly limited. The drivetrain is a set of mechanical elements arranged on a path for transmitting a driving force from a driving source such as a motor to an object to be driven, and includes, for example, mechanical elements that are rotating bodies such as gears, planetary gear mechanisms, and the like. The drivetrain may also include elements such as shafts, transmission belts, and the like.

Figure 1:
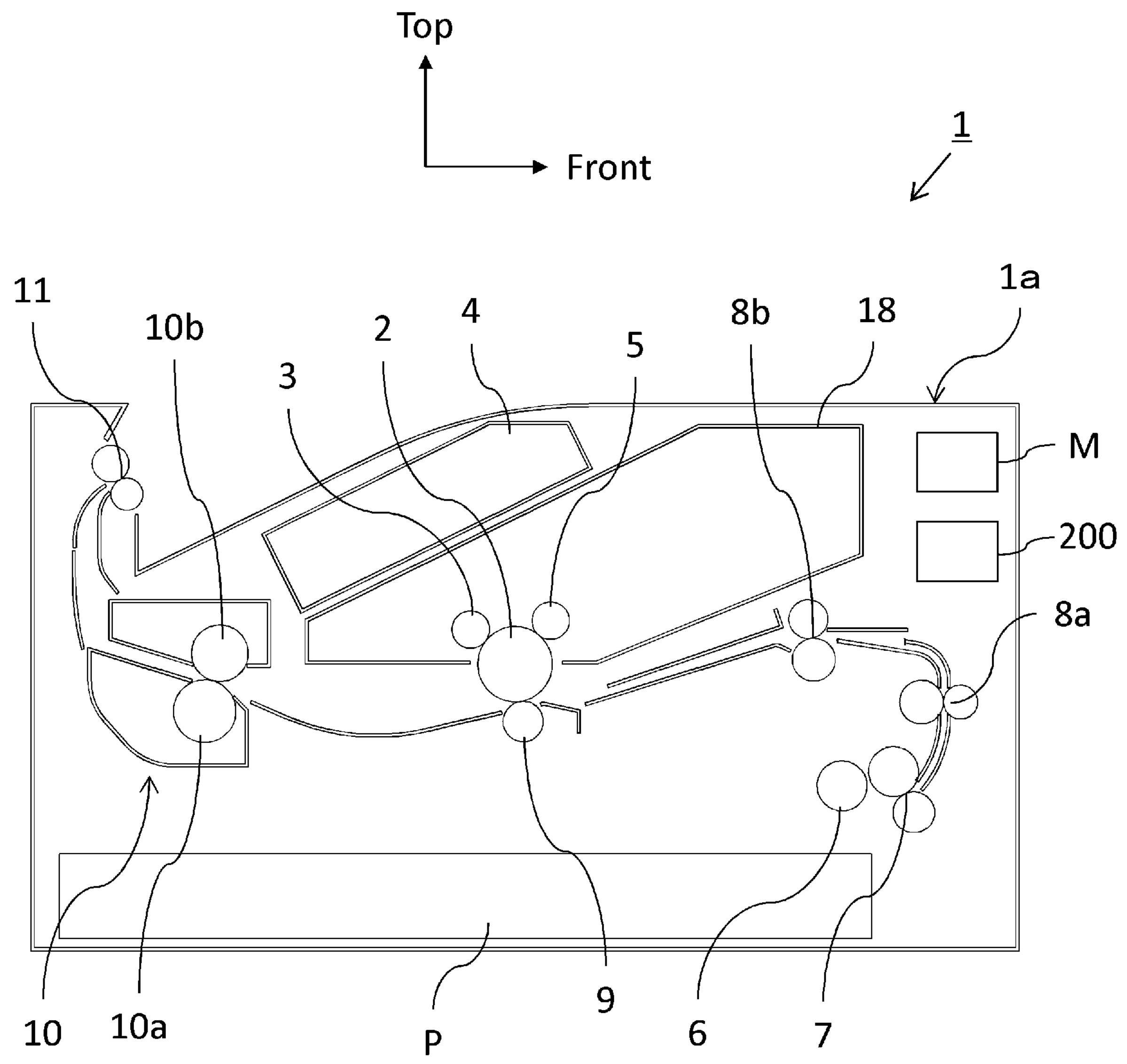
FIG. 1 is a cross-sectional explanatory view showing the configuration of an image forming apparatus according to Embodiment 1.

FIG. 1 is a cross-sectional view of an image forming apparatus 1. The surface of a photosensitive drum 2 (image bearing member) is uniformly charged by a charging roller 3 as a charging means as the photosensitive drum 2 rotates. The photosensitive drum 2 is irradiated with laser light corresponding to image information from the optical means 4 to form an electrostatic latent image corresponding to the image information on the photosensitive drum 2. A toner image (developer image) is formed by supplying a toner (developer) carried by a developing roller 5 as a developer carrying member to the electrostatic latent image formed on the photosensitive drum 2.

Meanwhile, in synchronism with the formation of the toner image, a recording material P is separated and fed one by one by a pickup roller 6 and a paper feed roller 7. The recording material P is conveyed to a transfer roller 9 as a transfer means by conveying rollers 8*a* and 8*b*, and the toner image formed on the photosensitive drum 2 is transferred onto the recording material P. The recording material P to which the toner image has been transferred is conveyed to a fixing device 10. The fixing device has a driving roller 10*a* and a fixing roller 10*b* containing a heater. The driving roller 10*a* and the fixing roller 10*b* apply heat and pressure to the recording material P to fix the transferred toner image on the recording material P. After that, the recording material P is discharged by a discharge roller 11. The image forming apparatus 1 forms an image on the recording material P as described above.

Various processes performed by the image forming apparatus are executed by a control unit 200 controlling each component in accordance with a program or a user's instruction input. A computer, a control circuit, or the like can be used as the control unit 200. In the present embodiment, the image forming apparatus 1 has an apparatus main body 1*a* and a process cartridge 18 (cartridge) as a cartridge detachably attached to the apparatus main body 1*a*. The process cartridge 18 includes the photosensitive drum 2, the charging roller 3 and the developing roller 5. In the present embodiment, an example in which the process cartridge 18 is attachable to and detachable from the apparatus main body 1*a* of the image forming apparatus 1 will be described, but the present invention is not limited to the image forming apparatus 1 adopting a system in which the process cartridge 18 is attachable to and detachable from the apparatus main body 1*a*.

Restriction of Drivetrain Rotation Direction

Figure 2:
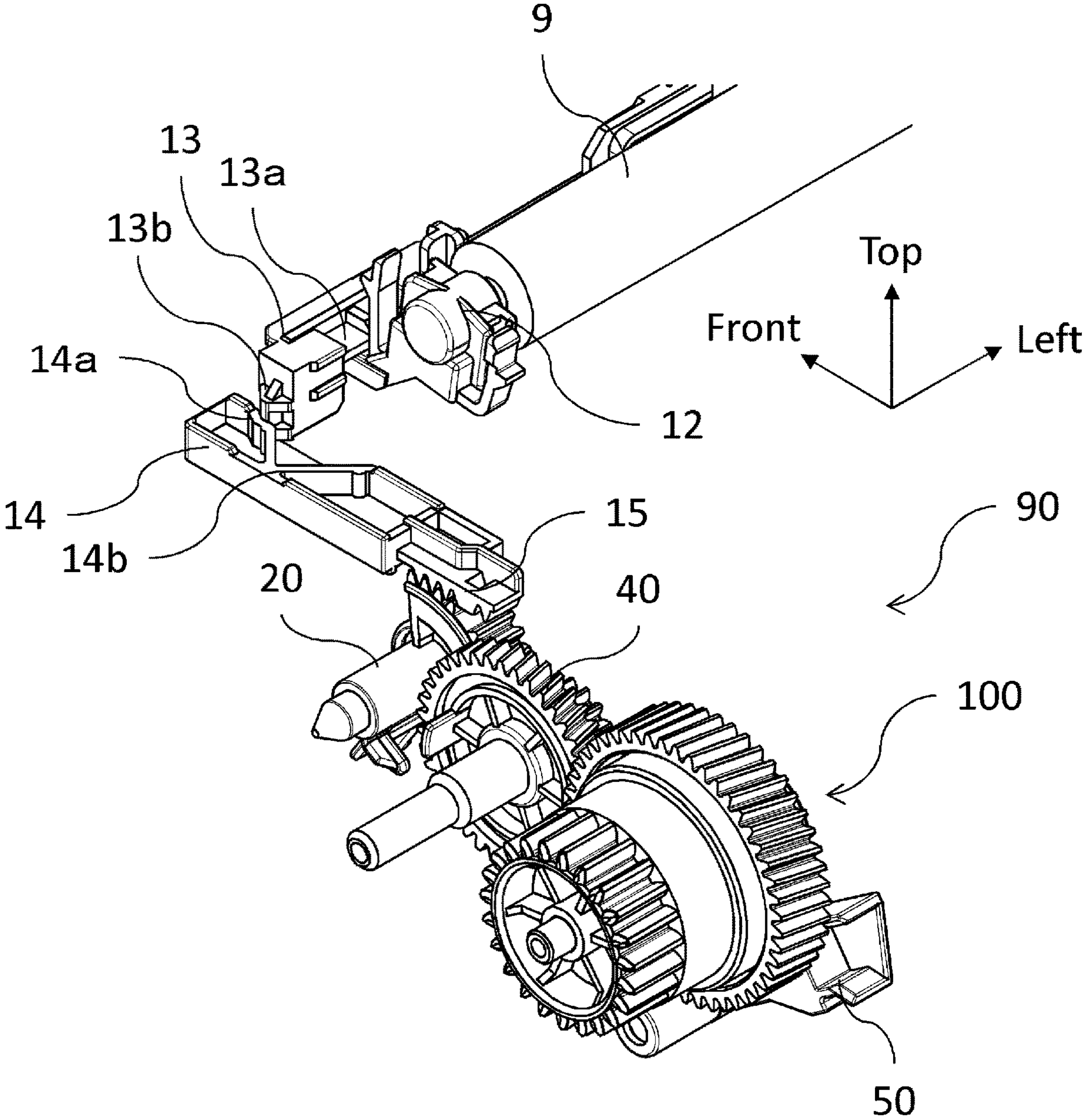
FIG. 2 shows the configuration at the time of transfer separation according to Embodiment 1.
Figure 3A:
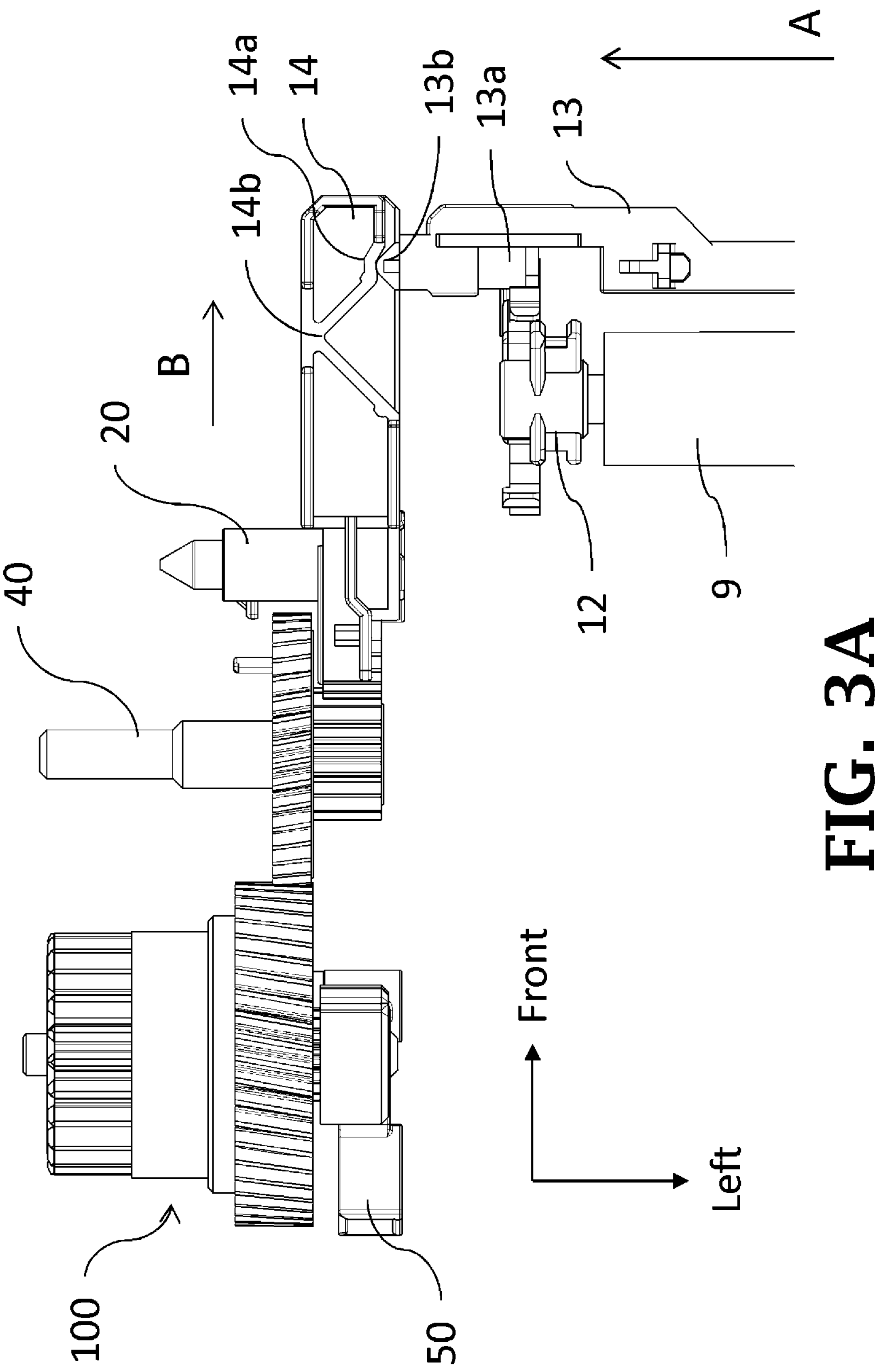
FIG. 3A shows the operation at the time of transfer separation according to Embodiment 1.
Figure 3B:
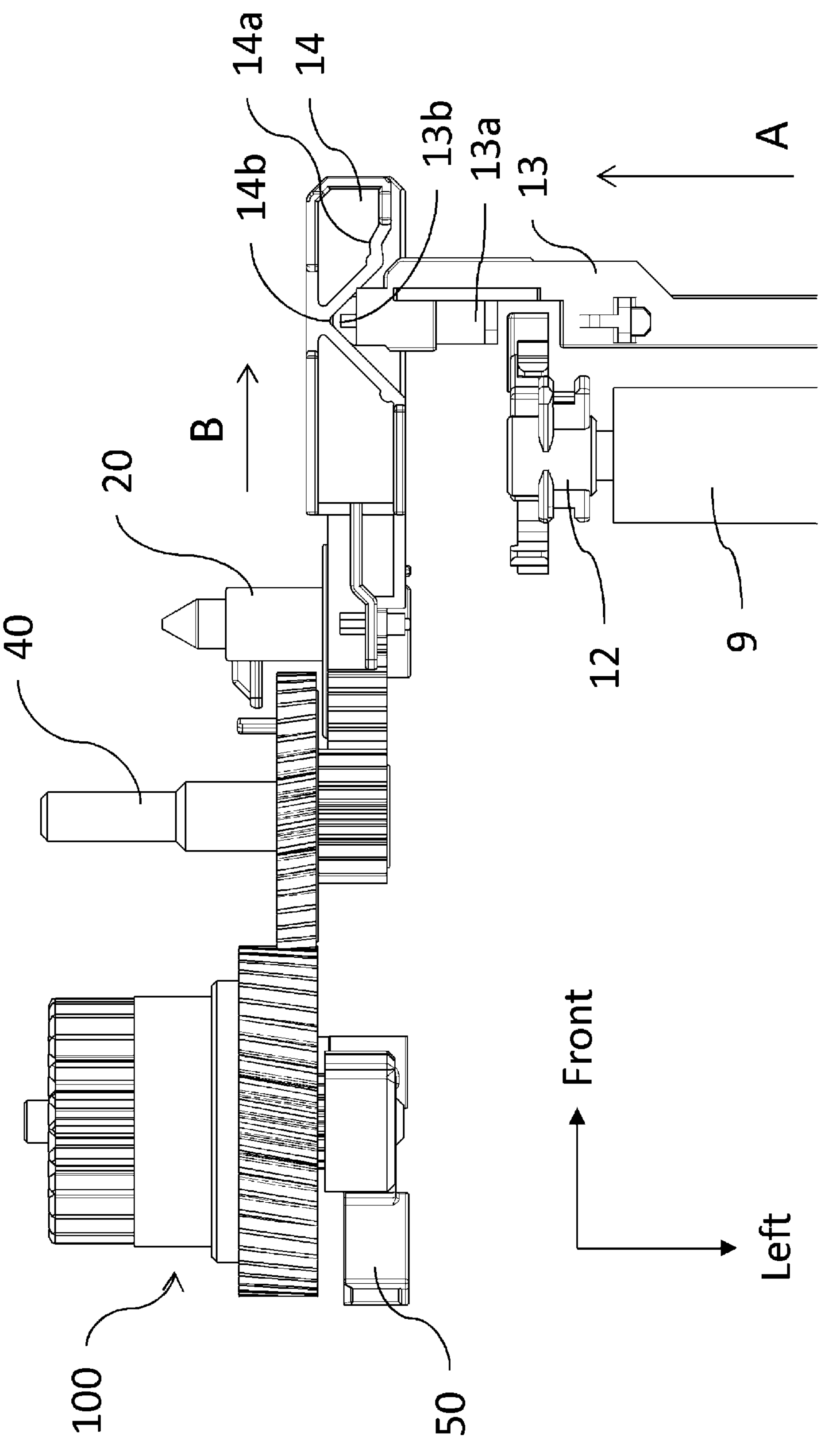
FIG. 3B is another diagram showing the operation when releasing the transfer separation according to Embodiment 1.
Figure 4:
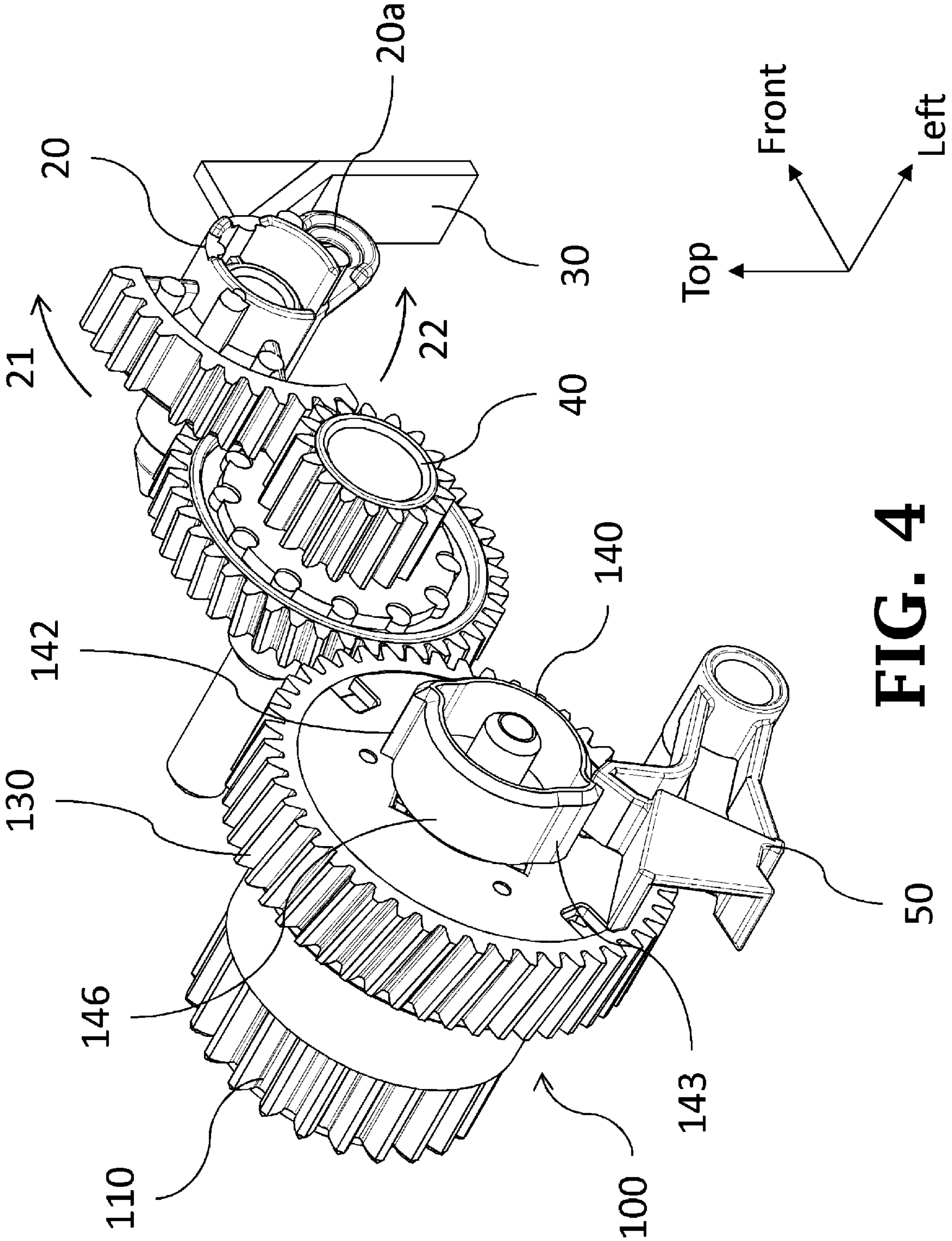
FIG. 4 shows the configuration of the drivetrain according to Embodiment 1.

Restriction of the rotation direction of a drivetrain 90 according to the Embodiment 1 will be described with reference to FIGS. 2, 3A, 3B, and 4. FIG. 2 is a perspective view showing the configuration at the time of transfer separation. FIG. 3A is a plan view showing the configuration at the time of transfer separation, FIG. 3B is a plan view showing the configuration when the transfer separation is released. FIG. 4 is a perspective view showing the configuration of a drivetrain that transmits a driving force for releasing the transfer separation. In FIGS. 3A and 3B, the direction from the back side to the front side of the paper surface is the direction in which the transfer roller 9 approaches the photosensitive drum 2, and the opposite direction is the direction in which the transfer roller 9 moves away from the photosensitive drum 2.

The image forming apparatus 1 has a motor M and the drivetrain 90 that transmits the driving force of the motor M. The drivetrain 90 includes a planetary gear mechanism 100 and a driven gear 20. In the present embodiment, the drivetrain 90 further includes an idler gear 40. The motor M is configured to drive the planetary gear mechanism 100 and the process cartridge 18.

In the present embodiment, a rotating body of the process cartridge 18 is driven by the driving force of the motor M, but members other than the rotating body may also be driven thereby. Further, in the present embodiment, the photosensitive drum 2 is driven as the rotating body, but a rotating body other than the photosensitive drum 2, such as the developing roller 5, may also be driven.

The transfer roller 9 is preferably separated from the photosensitive drum 2 in order to avoid rubbing between the transfer roller 9 and the photosensitive drum 2, for example, when the image forming apparatus 1 is not used. The image forming apparatus 1 has a separation mechanism for separating the transfer roller 9 from the photosensitive drum 2. The separation mechanism has a separation member (holding member) 13 and a switching cam (switching member, moving member, slider member) 14.

The transfer roller 9 is supported by a bearing 12. As shown in FIG. 3A, when the transfer roller 9 is separated, the bearing 12 is held by the separation member 13, and movement of the transfer roller 9 in the direction of contact with the photosensitive drum 2 is restricted. Specifically, a holding portion 13*a* of the separation member 13 holds the bearing 12 so that the transfer roller 9 is kept separated from the photosensitive drum 2. The separation member 13 is biased toward the switching cam 14 in the arrow A direction in the drawing. The switching cam 14 is provided with a receiving portion 14*a*, and a portion 13*b* to be received of the separation member 13 comes into contact with the receiving portion 14*a*, whereby the separation member 13 is held at a position where the bearing 12 is held. At this time, the separation member 13 functions as a holding member that holds the bearing 12 with the holding portion 13*a* in a state in which the transfer roller 9 and the photosensitive drum 2 are separated from each other.

The switching cam 14 is provided with a rack (gear portion) 15, and the rack 15 meshes with the driven gear 20. The driven gear 20 is a gear that transmits the driving force for releasing the separation state of the transfer roller 9 and is arranged downstream of the planetary gear mechanism in the path for transmitting the driving force.

The driven gear 20 rotates in a release direction 21 to move the switching cam 14 in the direction of arrow B in FIG. 3A. The movement of the separation member 13 releases the restriction in the direction in which the transfer roller 9 comes into contact with the photosensitive drum 2, and the transfer roller 9 comes into contact with the photosensitive drum 2.

Specifically, the switching cam 14 is provided with a recess 14*b* as a releasing portion. Where the switching cam 14 moves in the direction of arrow B in FIG. 3A, the portion 13*b* to be received is separated from the receiving portion 14*a* and received by the recess 14*b*. As shown in FIG. 3B, where the portion 13*b* to be received is received by the recess 14*b*, the holding portion 13*a* is separated from the bearing 12. As a result, the bearing 12 and the transfer roller 9 move so that the transfer roller 9 comes into contact with the photosensitive drum 2. In this manner, the switching cam 14 slides in the direction of arrow B to change the contact position of the portion 13*b* to be received between the receiving portion 14*a* and the recess 14*b*, thereby making it possible to switch the relationship between the transfer roller 9 and the photosensitive drum 2 between the contact state and the separation state. Therefore, the switching cam 14 can be called a switching member, a moving member, or a slider member.

In the present embodiment, the driven gear 20 is coupled to the planetary gear mechanism 100 through the idler gear 40, and the driving force of the motor M is transmitted to the driven gear 20 through the planetary gear mechanism 100 and the idler gear 40. The driven gear 20 has a gear portion formed in a part thereof in the circumferential direction. Where the idler gear 40 continues to rotate the driven gear 20 in the release direction 21, the driven gear 20 is moved to a position where the gear portion of the driven gear 20 no longer meshes with the idler gear 40. That is, by rotating in the release direction 21, the driven gear 20 can move to a disconnection position where the coupling between the driven gear 20 and the planetary gear mechanism 100 is cut off. The planetary gear mechanism 100 and the driven gear 20 may be directly meshed with each other.

In the present embodiment, when the gear portion of the driven gear 20 is moved to a position where it no longer meshes with the idler gear 40, the portion 13*b* to be received of the separation member 13 comes into contact with the slope between the receiving portion 14*a* and the recess 14*b*. At this time, since the separation member 13 is biased in the direction of arrow A shown in FIG. 3A, the switching cam 14 further moves in the direction of arrow B in FIG. 3A. As a result, the driven gear 20 is further rotated in the release direction 21 by the rack 15, and the gear portion of the driven gear 20 separates from the idler gear 40. The switching cam 14 and the rack 15 reach the restriction release position, and the portion 13*b* to be received is received by the recess 14*b* (FIG. 3B).

Each member may be also arranged so that when the gear portion of the driven gear 20 is moved to a position where it no longer meshes with the idler gear 40, the switching cam 14 and the rack 15 simultaneously reach the restriction release position, and the portion 13*b* to be received is received by the recess 14*b*.

Thus, when the image forming apparatus 1 in the present embodiment is unused (new product), the transfer roller 9 is separated from the photosensitive drum 2, and when the image forming apparatus 1 is used, the transfer roller 9 comes into contact with the photosensitive drum 2.

The driven gear 20 has an arm 20*a* as a portion to be restricted that can come into contact with the restricting member 30 and is restricted by the restricting member Regarding the rotation direction of the driven gear 20, the direction in which the arm 20*a* approaches the restricting member 30 is called a separation direction (restriction direction) 22. Meanwhile, the release direction 21 is opposite to the separation direction 22 and is the direction in which the arm 20*a* moves away from the restricting member 30. When the arm 20*a* is in contact with the restricting member 30, the rotation of the driven gear 20 in the separation direction 22 is restricted. For this purpose, the restricting member 30 is fixed so as not to move even when receiving a rotational force from the driven gear 20, and is arranged, for example, in the apparatus main body 1*a*. Although the restricting member 30 in the example of FIG. 4 is a member having a restricting surface, the structure of the restricting member 30 is not limited to this as long as the restricting member has a portion capable of coming into contact with the arm 20*a*.

That is, the rotation of the driven gear 20 in the separation direction 22 is restricted by the restricting member 30, thereby preventing damage or separation failure due to excessive movement of the switching cam 14 and maintaining the proper position of the switching cam 14. As described above, the driven gear in the present description refers to a gear that is not restricted when rotating in one direction (release direction 21), but when the driven gear rotates in the other direction (separation direction 22), the rotation thereof is restricted by the restricting member 30 at a certain location.

As shown in FIG. 4, when the arm 20*a* comes into contact with the restricting member 30 and the rotation of the driven gear 20 in the separation direction 22 is restricted, the portion 13*b* to be received of the separation member 13 is received by the receiving portion 14*a* of the switching cam 14, and the transfer roller 9 is separated from the photosensitive drum 2.

Here, let us assume that in a state in which the transfer roller 9 is separated and the driven gear 20 is restricted by the restricting member 30, a force that rotates the driven gear 20 in the separation direction 22 is applied to the planetary gear mechanism 100 coupled to the driven gear 20. In this case, since the driven gear 20 cannot rotate in the separation direction 22, the drivetrain 90 cannot rotate, and a load is applied to the gears and the shaft supporting the drivetrain. Therefore, it is preferable to release the force that rotates the driven gear 20 in the separation direction 22.

Planetary Gear Mechanism

Figure 5A:
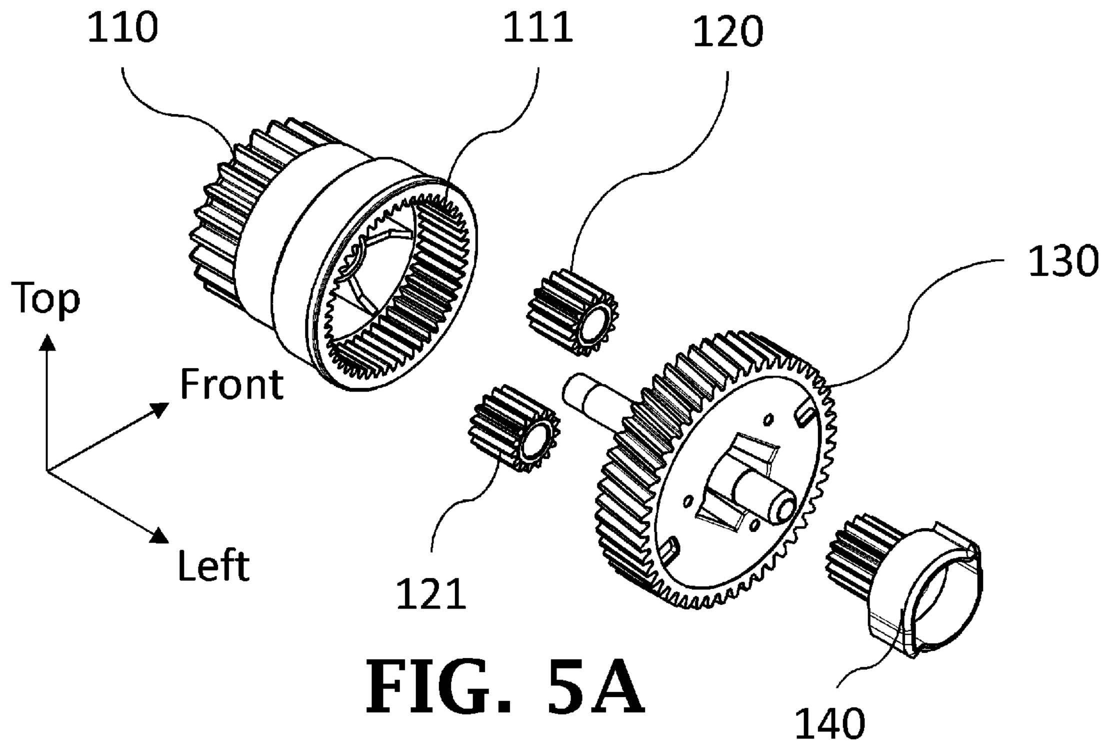
FIGS. 5A and 5B show the configuration of a planetary gear mechanism according to Embodiment 1.
Figure 5B:
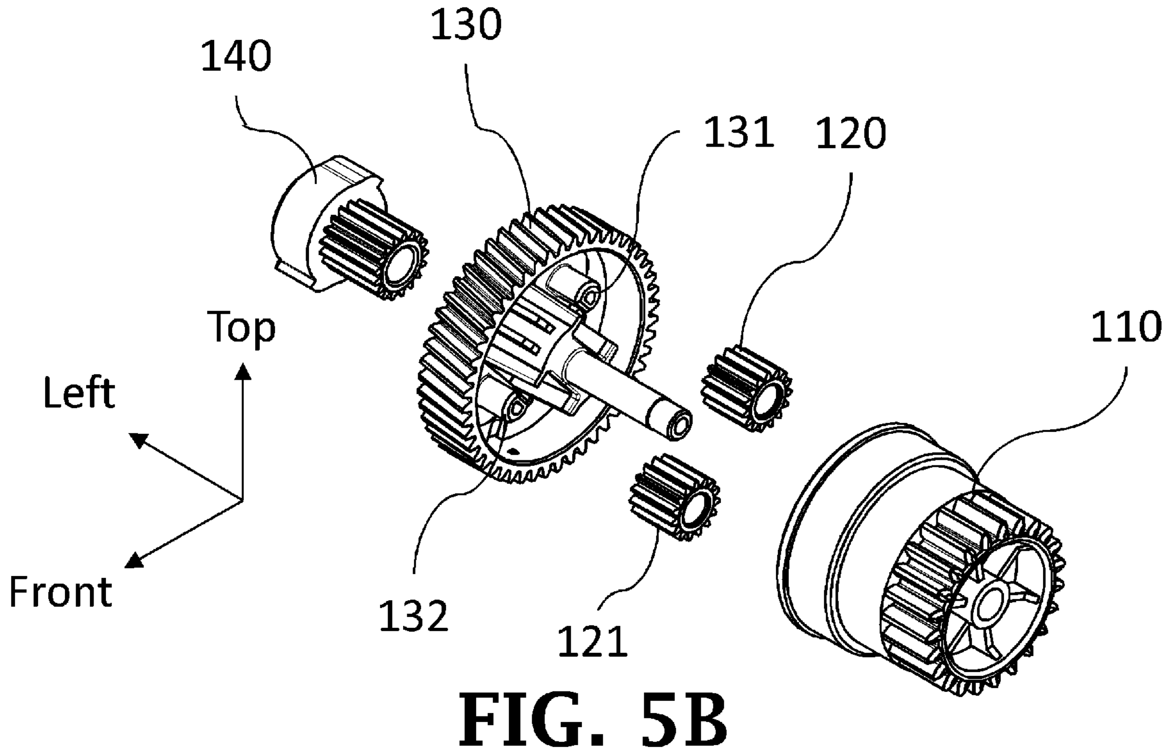
Figure 6A:
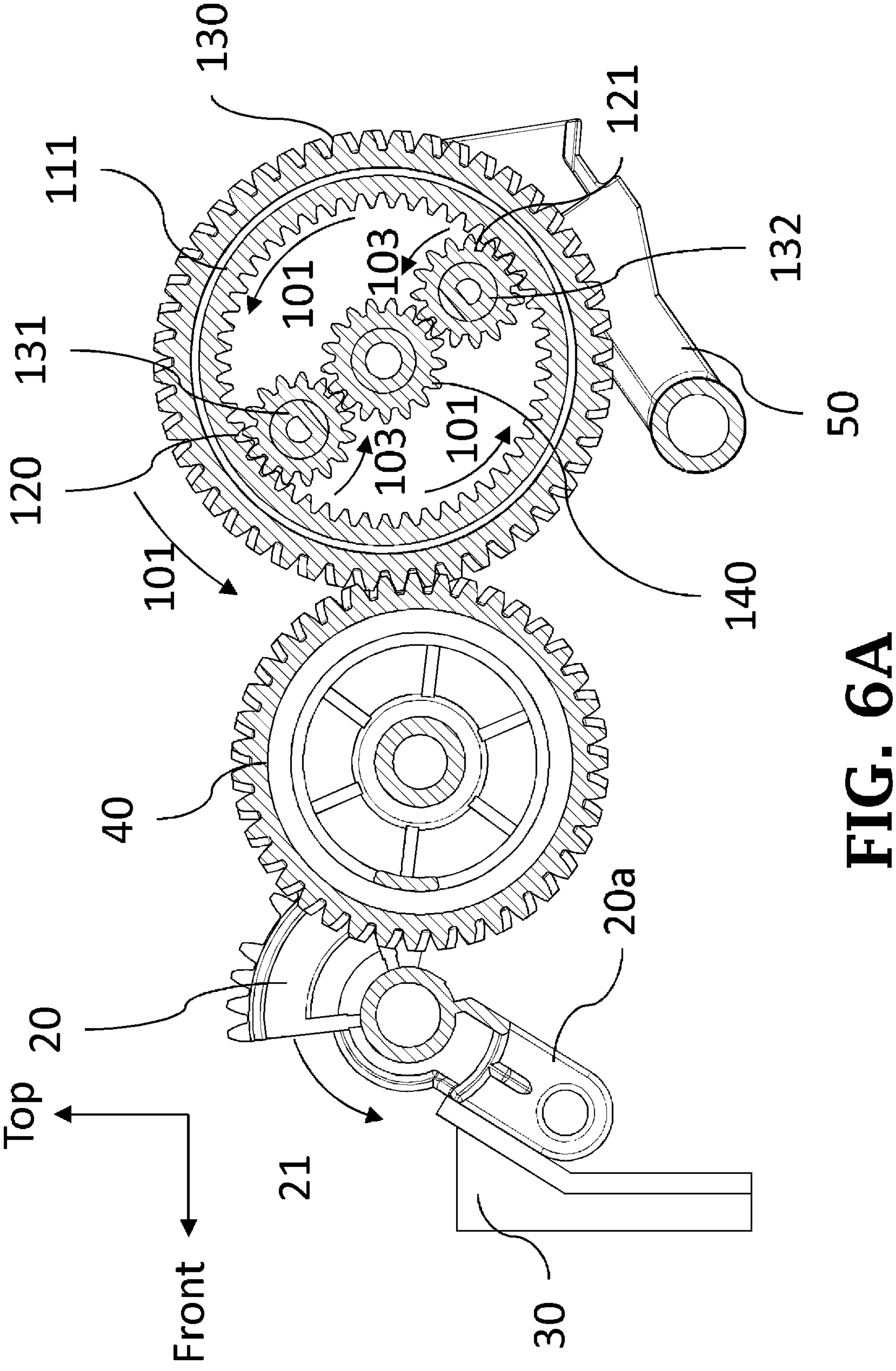
FIG. 6A shows the drivetrain operation when the driven gear rotates in the release direction in Embodiment 1.
Figure 6B:
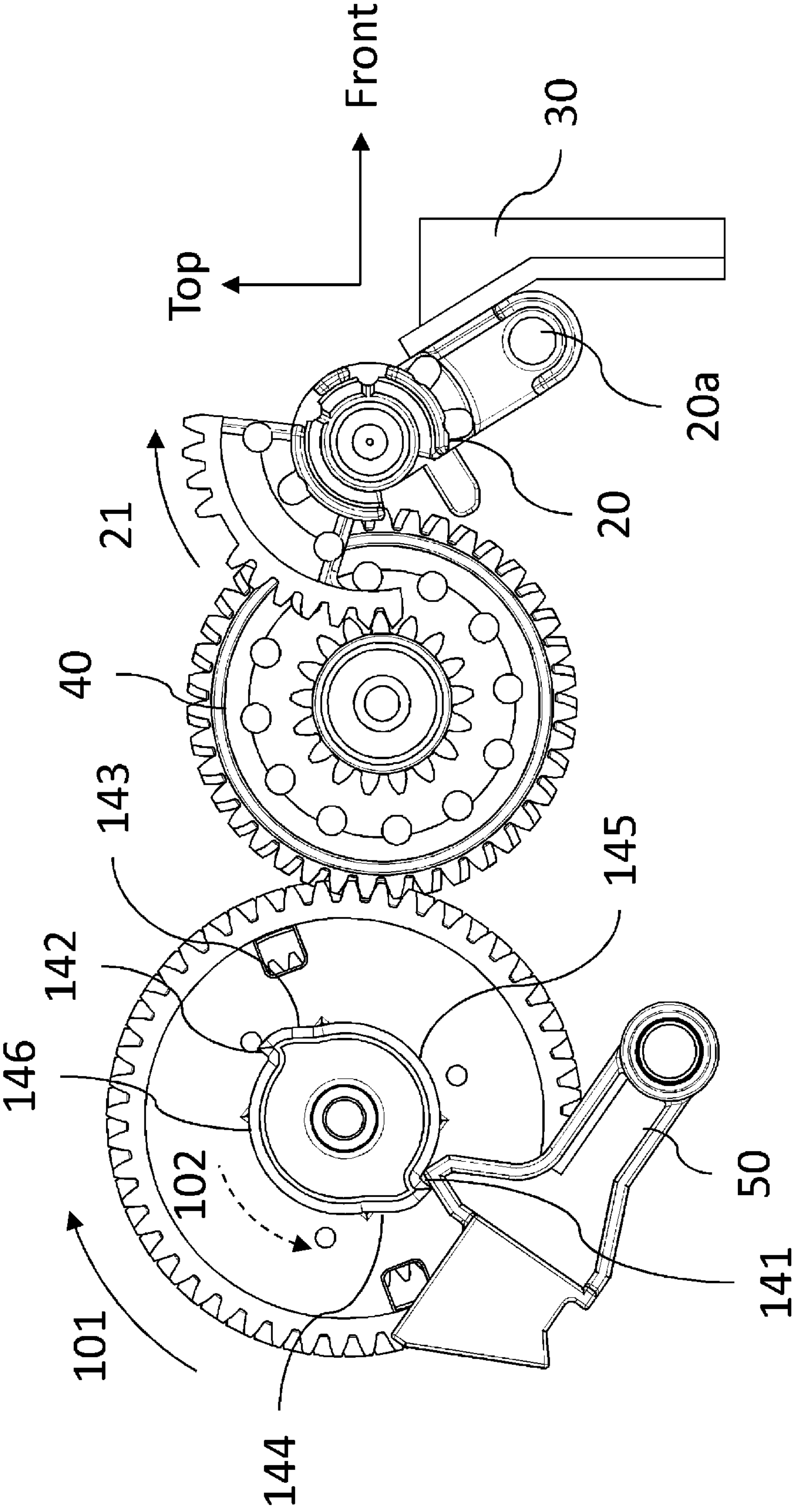
FIG. 6B is another drawing showing the drivetrain operation when the driven gear rotates in the release direction in Embodiment 1.

The planetary gear mechanism will be described using FIGS. 4, 5A, 5B, 6A, 6B, and 7. FIGS. 5A and 5B represent the planetary gear mechanism, and FIGS. 6A and 6B represent the drivetrain operation when the driven gear rotates in the release direction.

The planetary gear mechanism 100 is configured to transmit a driving force from the motor M and has an input gear (input portion, input member, internal gear) 110 having an internal gear portion 111, and a first planetary gear 120 and a second planetary gear 121 that mesh with the internal gear portion 111. The input gear 110 is configured to receive the driving force transmitted from the motor M. Further, the planetary gear mechanism 100 has a planetary carrier (output portion, output member) 130 as a carrier, and a sun gear (portion to be stopped) 140 that meshes with the first planetary gear 120 and the second planetary gear 121. The planetary carrier 130 includes a first support shaft 131 and a second support shaft 132 on which the first planetary gear 120 and the second planetary gear 121 are rotatably supported.

In addition, the planetary carrier 130 is coupled to the driven gear 20 through the idler gear 40 and is configured to transmit the driving force transmitted from the motor M to the input gear 110 to the driven gear 20. In an alternative configuration, the planetary carrier 130 and the driven gear 20 may be directly meshed without the idler gear 40 interposed therebetween.

The image forming apparatus 1 also has a stopper (stopping member) 50 configured to stop the sun gear 140 while the input gear 110 rotates in a first direction 101. In the present embodiment, the stopper is configured to be movable in a direction intersecting (preferably orthogonal to) the rotation axis of the sun gear 140.

The first planetary gear 120 and the second planetary gear 121 are rotatably supported by a first support shaft 131 and a second support shaft 132. The rotation of the first planetary gear 120 and the second planetary gear 121 around the first support shaft 131 and the second support shaft 132 is called spinning of the first planetary gear 120 and the second planetary gear 121. Also, as will be described hereinbelow, the first planetary gear 120 and the second planetary gear 121 can revolve around the sun gear 140. Where the first planetary gear 120 and the second planetary gear 121 revolve around the sun gear 140, the first support shaft 131 and the second support shaft 132 also revolve around the sun gear 140. As a result, the planetary carrier 130 rotates.

When a driving force is applied to the input gear 110 in the first direction 101, the driving force is transmitted to the first planetary gear 120 and the second planetary gear 121 through the internal gear portion 111. At this time, the driving force acts on the first support shaft 131 and the second support shaft 132 of the planetary carrier 130 and on the sun gear 140 through the first planetary gear 120 and the second planetary gear 121.

The sun gear 140 is provided with a first holding surface 145, a second holding surface 146, and a first portion 141 to be locked and a second portion 142 to be locked which are projections from the holding surfaces. At a position where the stopper 50 is separated from the first portion 141 to be locked and the second portion 142 to be locked, the sun gear 140 rotates while rubbing against the stopper 50 on the first holding surface 145 or the second holding surface 146. In the following description, it is assumed that the stopper 50 rubs against the first holding surface 145.

Meanwhile, a driving force that rotates the driven gear 20 in the release direction 21 acts on the planetary carrier 130 in the first direction 101. The planetary carrier 130 is coupled to the driven gear 20 that meshes with the rack 15 of the switching cam 14. Due to the frictional resistance acting on the switching cam 14 and the biasing of the separation member 13 toward the switching cam 14, a certain force is required for the planetary carrier 130 to rotate and to move the switching cam 14 through the driven gear 20 and the rack 15.

As a result, when the stopper 50 is separated from the first portion 141 to be locked and the second portion 142 to be locked, the first planetary gear 120 and the second planetary gear 121 spin counterclockwise in FIG. 6A while the planetary carrier 130 does not rotate. Due to the spinning of the first planetary gear 120 and the second planetary gear 121, a driving force is transmitted to the sun gear 140 to rotate in a second direction 102 different from the first direction 101.

Figure 7:
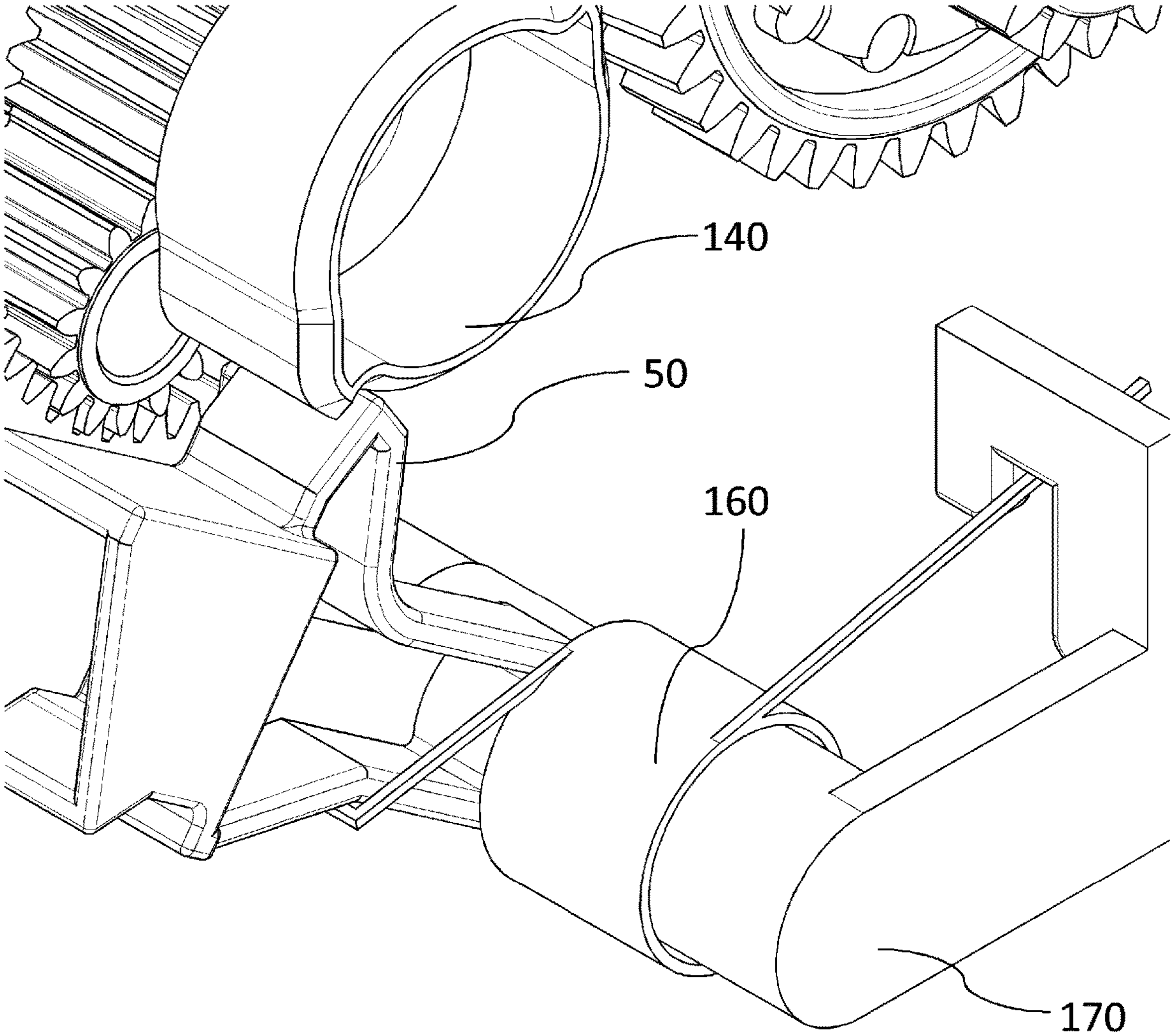
FIG. 7 shows the configuration and arrangement of a biasing means according to Embodiment 1.

Here, the stopper 50 is biased by the biasing means 160 to come into contact with the first holding surface 145. FIG. 7 shows an example of the configuration and arrangement of such biasing means 160. The biasing means 160, which is an elastic body, is connected at one end to the stopper 50 and connected and fixed at the other end to a main body frame 170. Where the biasing means 160 is incorporated into the apparatus, the biasing means exerts a rotational biasing force that urges the stopper 50 toward the sun gear 140. A spring can be used as the biasing means 160. In the present embodiment, the biasing means 160 is a torsion coil spring.

Where the stopper 50 biased to the first holding surface 145 by the biasing means 160 engages with the first portion 141 to be locked in the course of rotation of the sun gear 140 in the second direction 102, the rotation of the sun gear 140 in the second direction 102 is restricted. That is, the stopper 50 is configured to restrict the rotation of the sun gear 140 in the first rotation direction and stop the rotation of the sun gear 140 in the first rotation direction while the input gear 110 rotates in the first direction 101.

In the configuration of the present embodiment, the rotation of the sun gear 140 is restricted and the sun gear 140 is stopped by contact between the first portion 141 to be locked or the second portion 142 to be locked and the stopper 50 while the input gear 110 rotates in the first direction 101. However, the present invention is not limited to this configuration. For example, another gear that meshes with the sun gear 140 may have a configuration corresponding to the first portion 141 to be locked and the second portion 142 to be locked and may come into contact with the stopper 50.

The engagement between the stopper 50 and the first portion 141 to be locked of the present embodiment will be described with reference to the partially enlarged view of FIG. 10. The first portion 141 to be locked rises from the first holding surface 145 at a rising base portion 141*c* to form a locking surface 141*b* protruding from the first holding surface 145. The gear-side locking surface 141*b* forms a surface within a range from the rising base portion 141*c* to a rising top portion 141*a*. The stopper 50 is in contact with and rubs against the first holding surface 145 mainly by a top portion 50*b*. Further, at the time of engagement with the first portion 141 to be locked, a locking means-side locking surface 50*a* is in contact with the gear-side locking surface 141*b* or the rising top portion 141*a*.

Where the input gear 110 rotates in the first direction 101 while the rotation of the sun gear 140 is restricted, the first planetary gear 120 and the second planetary gear 121 rotate (revolve) in the first direction 101 around the rotation axis of the sun gear 140 while spinning counterclockwise (direction 103) in FIG. 6A.

Since each planetary gear is attached to the first support shaft 131 and the second support shaft 132 provided at the planetary carrier 130, the planetary carrier 130 also rotates in the first direction 101 together with the movement of each planetary gear. The driving force from the planetary carrier 130 is transmitted to the driven gear 20 through the idler gear 40, and the driven gear 20 rotates in the release direction 21. That is, the planetary gear mechanism 100 rotates the driven gear 20 in the release direction 21 by the planetary carrier 130 when the sun gear 140 is stopped and the input gear 110 rotates in the first direction 101.

In the case shown herein, two planetary gears and two support shafts are provided, but this configuration is not limiting. For example, similar effects can be obtained even if the number of planetary gears and support shafts is one or three or more.

Mechanism for Preventing Damage When Drivetrain Rotation Is Restricted

Figure 8A:
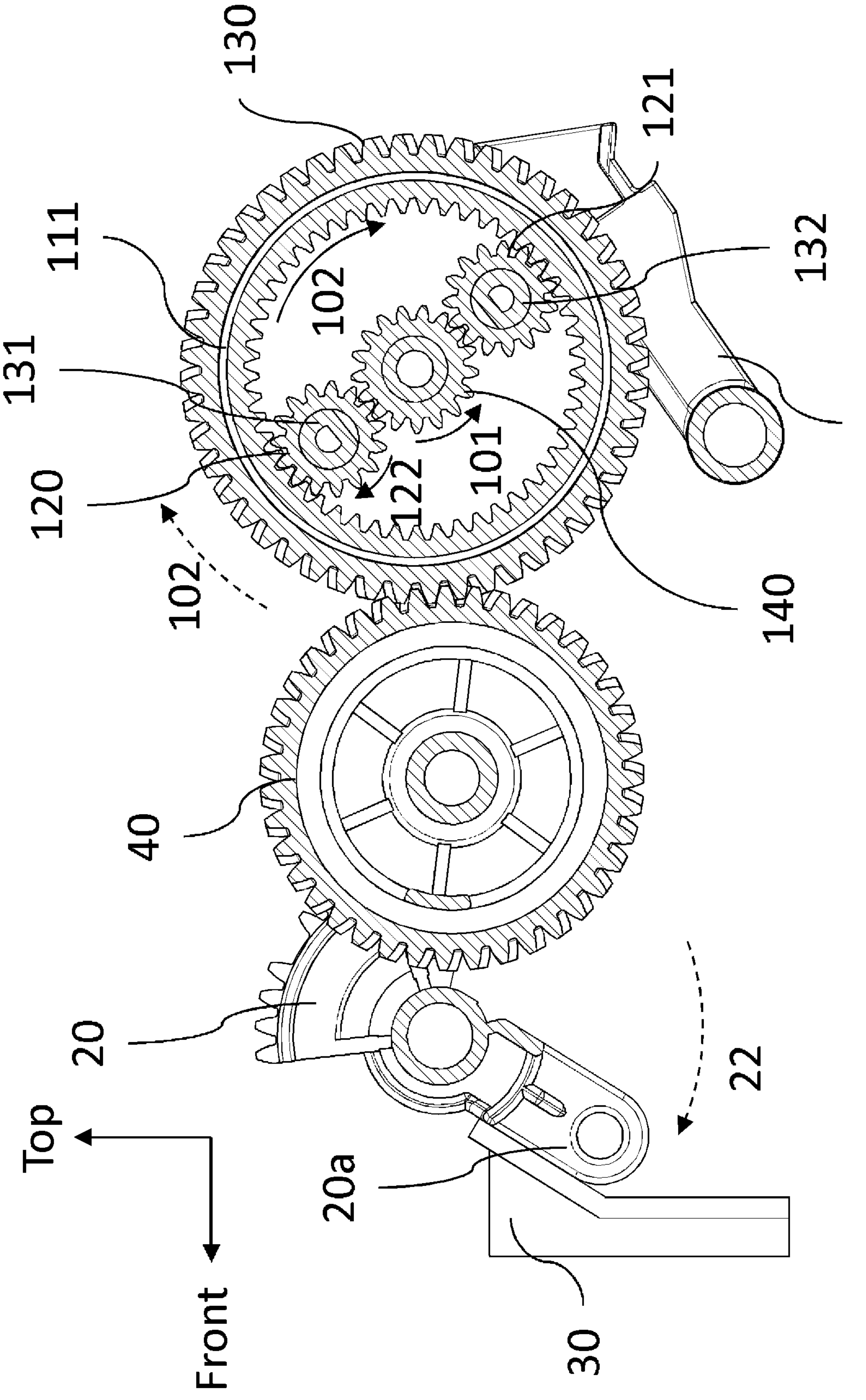
FIG. 8A shows the drivetrain operation when the driven gear rotates in the separation direction in Embodiment 1.
Figure 8B:
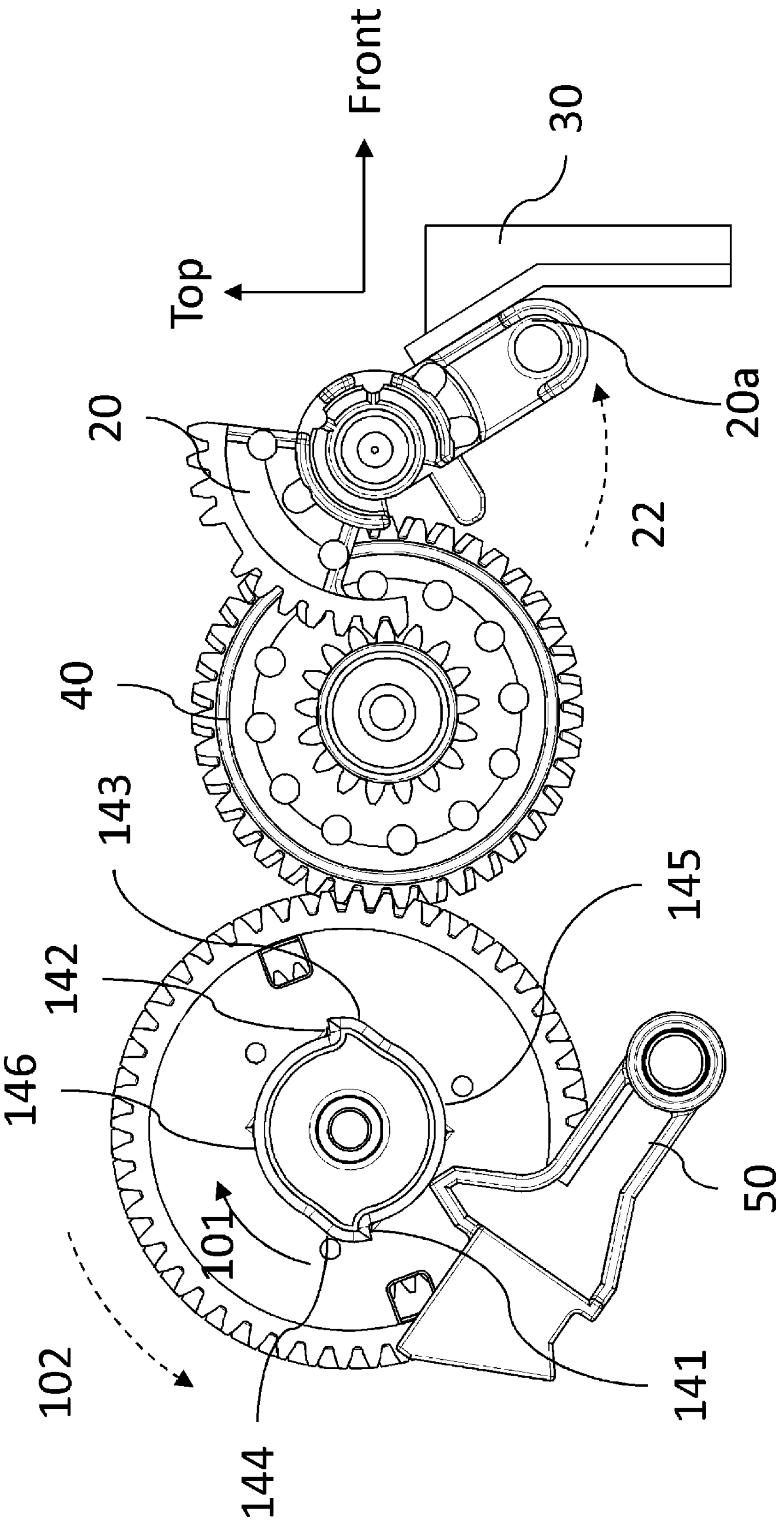
FIG. 8B is another drawing showing the drivetrain operation when the driven gear rotates in the separation direction in Embodiment 1.
Figure 9:
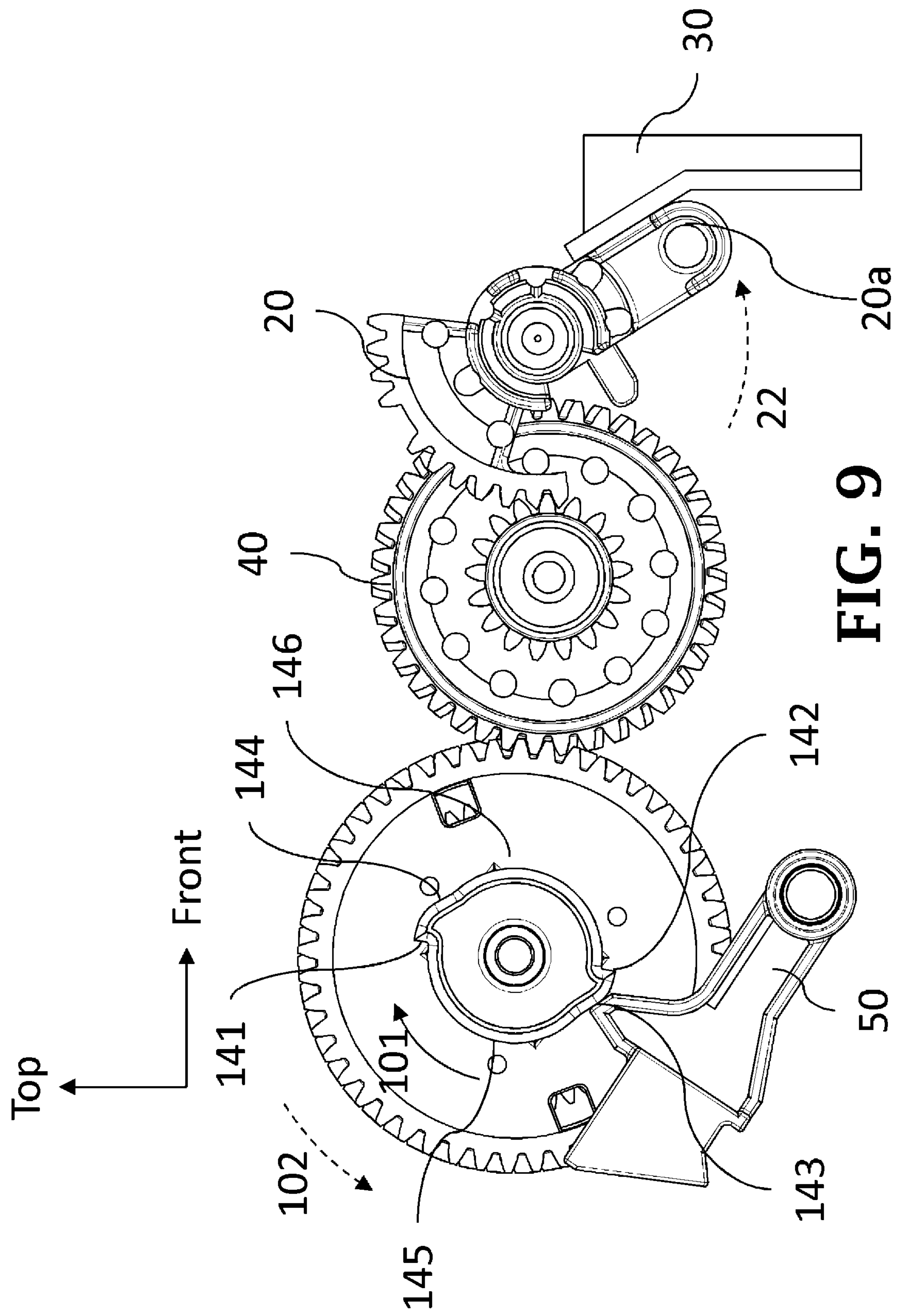
FIG. 9 shows the operation in which a sun gear according to Embodiment 1 rotates without engagement with a stopping member.

A mechanism for preventing damage when the drivetrain rotation is restricted will be described with reference to FIGS. 8A, 8B, and 9. FIGS. 8A and 8B show the drivetrain operation when the driven gear 20 rotates in the separation direction 22, and FIG. 9 shows how the sun gear 140 rotates without engagement with the stopper 50 by a tilted surface portion.

Where a driving force is applied to the input gear 110 in the second direction 102, the driving force causing, contrary to above, the rotation in the separation direction 22 is transmitted to the driven gear 20. However, the driven gear 20 is prevented from rotating in the separation direction 22 by the restricting member 30, and the planetary carrier 130 transmitting the driving force assumes a locked state. Therefore, the first planetary gear 120 and the second planetary gear 121 rotate about the first support shaft 131 and the second support shaft 132, respectively, in a spinning direction 122 and drive the sun gear 140 in the first direction 101. That is, the direction of the force received by the sun gear 140 due to rotation of the input gear 110 in the first direction 101 is opposite to the direction of the force received by the sun gear 140 due to contact of the arm 20*a* with the restricting member 30 and rotation of the input gear 110 in the second direction 102.

In the present embodiment, the stopper 50 restricts the rotation of the sun gear 140 and stops the sun gear 140 when the sun gear 140 rotates in the second direction 102. Meanwhile, the stopper 50 allows the rotation of the sun gear 140 when the sun gear 140 rotates in the first direction 101. Therefore, when the arm 20*a* is in contact with the restricting member 30, and the input gear 110 rotates in the second direction 102 opposite to the first direction 101, the sun gear 140 rotates in the first direction 101. At this time, the stopper 50 allows the sun gear 140 to rotate in the first direction 101. That is, the stopper 50 is configured to allow the sun gear 140 to rotate in the second rotation direction opposite to the first rotation direction.

The relationship between the sun gear 140 and the stopper 50 when the arm 20*a* is in contact with the restricting member 30 and the input gear 110 rotates in the second direction 102 will be described hereinbelow. The sun gear 140 is provided with a first inclined portion 143, and when the sun gear 140 rotates in the first direction 101, the stopper 50 is lifted by the first inclined portion 143 as shown in FIG. 9 and climbs over the second portion 142 to be locked to come into contact with the second holding surface 146. Where the sun gear 140 rotates further, the stopper is similarly lifted by a second inclined portion 144 and climbs over the first portion 141 to be locked to come into contact with the first holding surface 145 again. That is, the first inclined portion 143 and the second inclined portion 144 are inclined portions configured to move the stopper 50 when the sun gear 140 rotates in the second rotation direction.

Figure 10:
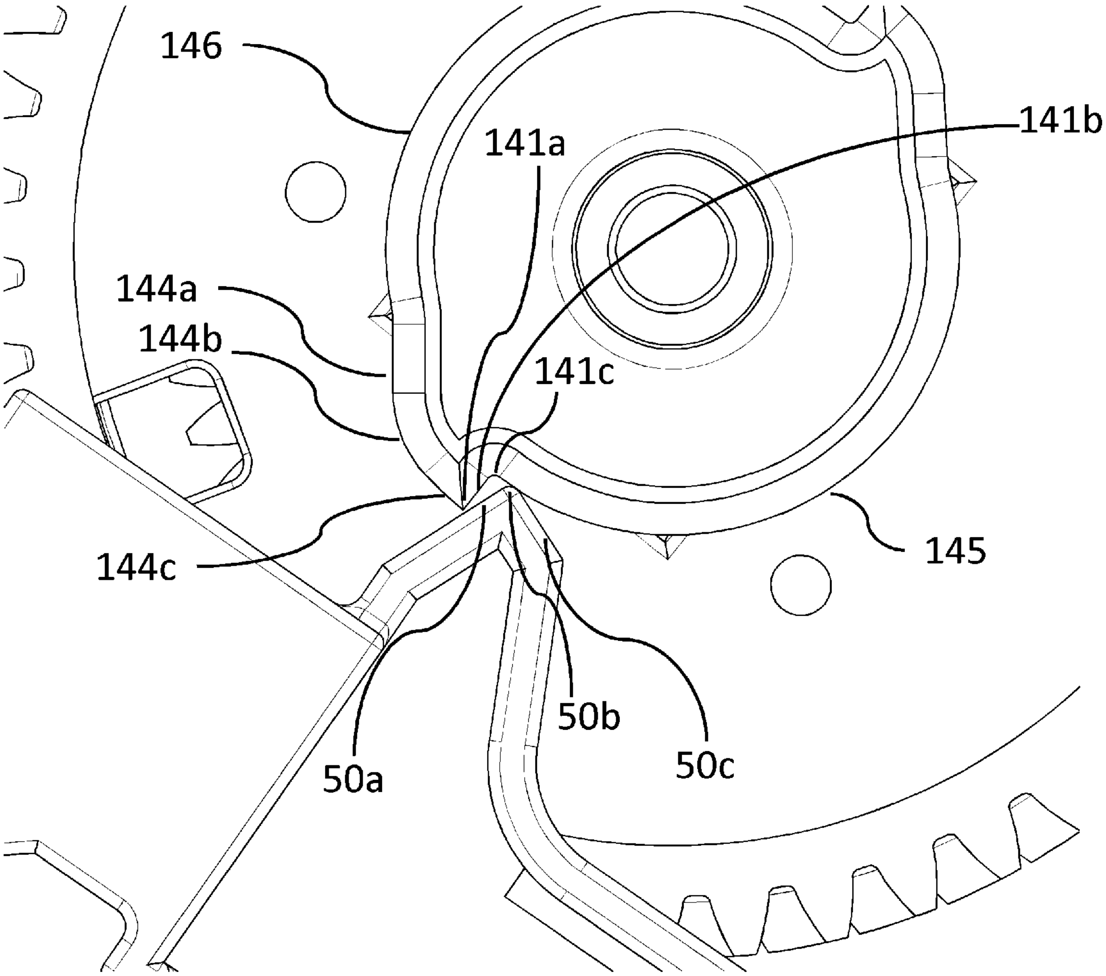
FIG. 10 is a partially enlarged view showing the configuration of the stopping member and the sun gear according to Embodiment 1.

In the example shown by the partially enlarged view in FIG. 10, the second inclined portion 144 includes a first portion 144*a* smoothly connected from the second holding surface, a second portion 144*b* smoothly connected from the first portion 144*a*, and a third portion 144*c* smoothly connected from the second portion 144*b*. The third portion 144*c* is connected to the locking surface 141*b* through the rising top portion 141*a* of the first portion 141 to be locked so that the surface has a discontinuous cliff shape. Thus, the second inclined portion 144 has a portion that is smoothly connected to the second holding surface 146 and inclined from the second holding surface 146, and a portion that is connected to the first holding surface 145 through the first portion 141 to be locked. In the portion connected to the first holding surface 145, the surface of the first holding surface 145 and the surface of the second inclined portion 144 are discontinuous due to the existence of the inclination angle.

With the above configuration, the sun gear 140 can rotate in the first direction 101 without being restricted by the stopper 50. That is, when the sun gear 140 rotates in the first direction 101, the top portion 50*b* (or a contact surface 50*c*) of the stopper 50 comes into smooth contact and rubs against the second inclined portion 144, so as to reach the rising top portion 141*a* of the first portion 141 to be locked without the movement thereof being restricted. At the rising top portion 141*a*, the stopper 50 is discontinuously moved to the first holding surface 145 by the biasing force. As a result, even if the driven gear 20 is driven in the separation direction 22 in which the rotation is restricted, the sun gear 140 idles to release the driving force, so that the drivetrain is not locked. That is, it is possible to prevent the drivetrain from being locked and the drivetrain, the shaft, and the like from being damaged.

In addition, it is not necessary to deform the support shafts that support the gears of the drivetrain 90 or to cause the gears to skip teeth in order to release the driving force. That is, when the sun gear 140 rotates to release the driving force when the input gear 110 rotates in the second direction 102, the coupled state of the drivetrain 90 is maintained. For example, the meshing (coupling) between the input gear 110, the first planetary gear 120 and the second planetary gear 121, the sun gear 140, and the planetary carrier 130 of the planetary gear mechanism 100 is maintained. Further, the meshing (coupling) between the planetary carrier 130 and the driven gear 20 through the idler gear 40 is maintained.

As described above, the stopper 50 climbs over the first portion 141 to be locked and the second portion 142 to be locked when the sun gear 140 rotates in the first direction 101. After the climbing, the stopper comes into contact with the first holding surface 145 or the second holding surface 146 again. At this time, in the present embodiment, the stopper 50 moves in a direction intersecting the direction of the rotation axis of the sun gear 140.

It is preferable that the first inclined portion 143 and the second inclined portion 144 be present in order for the stopper 50 to climb over the first portion 141 to be locked and the second portion 142 to be locked when the sun gear 140 rotates in the first direction 101. The force applied by the biasing means 160 in the direction of locking the stopper 50 is thereby dispersed. As a result, the force applied from the first portion 141 to be locked and the second portion 142 to be locked to the stopper 50 in the direction of releasing the locking becomes greater than the force applied by the biasing means 160 in the direction of locking the stopper 50.

Meanwhile, when the sun gear 140 rotates in the second direction 102, the stopper 50 engages with the first portion 141 to be locked and the second portion 142 to be locked. For this purpose, the design is such that the force applied by the biasing means 160 in the direction of locking the stopper 50 becomes larger that the force applied from the first portion 141 to be locked and the second portion 142 to be locked to the stopper 50 in the direction of releasing the locking. Therefore, the configurations of the stopper 50, the portions to be locked, and the like of the present invention are not limited to those shown in the drawings, and the materials, sizes, shapes, and structures of the stopper 50, the portions to be locked, the inclined portions, the holding surfaces, and the like, the biasing force of the biasing means, the momentum of the sun gear, and the like may be designed to satisfy the above relationships.

Also, as described above, in the present embodiment, the motor M is configured to drive the planetary gear mechanism 100 and the process cartridge 18. As a result, the force for moving the process cartridge 18 is transmitted to the drivetrain 90 and transmitted to the input gear 110. That is, the input gear 110 is rotated by attaching and detaching the process cartridge 18 to and from the apparatus main body. Even if the process cartridge 18 is attached and detached and the input gear 110 is rotated in the second direction 102 while the arm 20*a* is in contact with the restricting member 30, the force acting on the input gear 110 can be released by the rotation of the sun gear 140. Therefore, the process cartridge 18 can be smoothly attached and detached.

Figure 12:
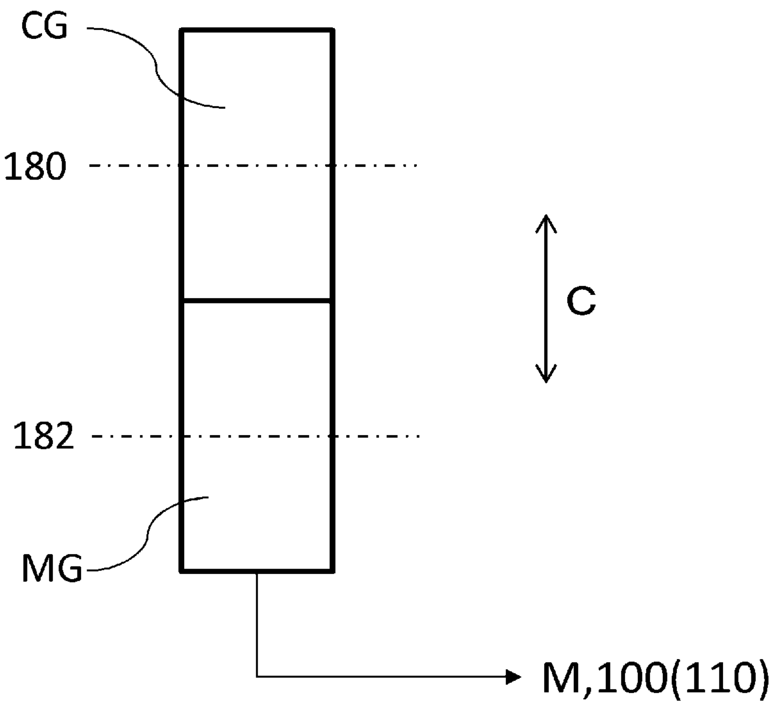
FIG. 12 explains the drive coupling between a process cartridge and an apparatus main body.

Here, the drive coupling between the process cartridge 18 and the apparatus main body 1*a* will be described with reference to FIG. 12. FIG. 12 explains the drive coupling between the process cartridge 18 and the apparatus main body 1*a*. In the configuration shown in FIG. 12, the process cartridge 18 has a gear CG, and the apparatus main body 1*a* has a gear MG coupled to the motor M and the planetary gear mechanism 100 (specifically, the input gear 110). The gear CG rotates around a rotation axis 180, and the gear MG rotates around a rotation axis 182. The driving force of the motor M is transmitted to the process cartridge 18 by meshing the gear CG and the gear MG. In such a configuration, the process cartridge 18 may be attached/detached in a direction (arrow C direction) intersecting the direction of the rotation axis 182 of the gear MG. In this case, when the process cartridge 18 is attached or detached, the gear MG is likely to rotate.

Since the gear MG is coupled to the motor M and the planetary gear mechanism 100, the rotation of the input gear 110 is likely to occur when the process cartridge 18 is attached or detached. Even with such a configuration, the force acting on the input gear 110 can be released by rotating the sun gear 140. Therefore, the process cartridge 18 can be smoothly attached and detached. The configuration of the drive coupling between the process cartridge 18 and the apparatus main body 1*a* described above is merely exemplary, and the present invention can also be applied to an image forming apparatus having a configuration other than that described above.

Here, the case where the sun gear is provided with two portions to be locked, two holding surfaces, and two inclined portions is shown, but such a configuration is not limiting. For example, similar effects can be obtained even if there are one or three or more portions to be locked, holding surfaces, and inclined portions.

Also, although the configuration in which the stopper 50 oscillates around the rotation shaft has been shown, this configuration is not limiting. For example, similar effects can be obtained even if the locking is by linear motion as long as the biasing direction allows smooth movement by the inclined portion.

Figure 11:
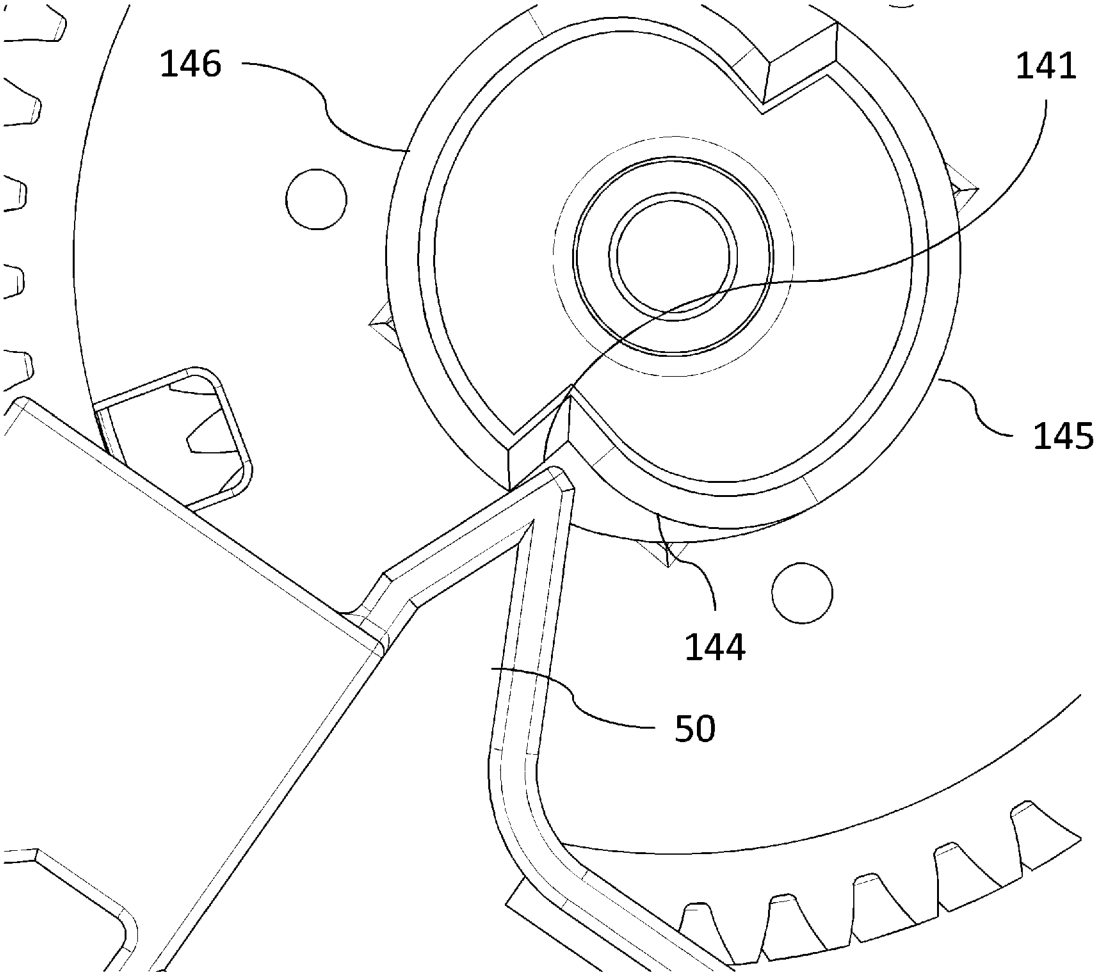
FIG. 11 is a partially enlarged view showing the configuration of the stopping member and the sun gear according to a modification example.

In addition, although a shape in which the portion to be locked protrudes outward in the radial direction of the sun gear (radial direction) from the holding surface has been shown, this shape is not limiting. For example, similar effects can be obtained even if the recess has a shape receding inward in the radial direction of the sun gear as long as the engagement with the stopper 50 is possible. FIG. 11 shows such a modification example, in which the stopper 50 engages with the first portion 141 to be locked having a receding shape in one direction of rotation but can come into contact with the first holding surface through the inclined portion 144 in the other direction of rotation.

Also, although the drivetrain for switching between the separation state and the contact state of the transfer roller 9 has been described as an example, such configuration is not limiting. For example, the present invention can also be applied to a drivetrain for switching between the separation state and the contact state between the photosensitive drum 2 and the developing roller 5 of the process cartridge. In addition, the present invention is applicable not only to the drivetrain that switches between the separation state and the contact state, but also to any drivetrain that may further apply a driving force in the restriction direction when the rotation is restricted.

That is, the driven gear 20 may be switched between the separation state and the contact state of the transfer roller 9, or may be switched between the separation state and the contact state between the developing roller 5 and the photosensitive drum 2.

Embodiment 2

A mechanism for preventing damage when the drivetrain rotation is restricted according to the Embodiment 2 will be described with reference to FIGS. 13 and 14. The same components as those described above are assigned with the same reference numerals, and the description thereof is omitted. In Embodiment 1, the cross-sections of the first holding surface 145 and the second holding surface 146 are shaped to be substantially concentric with the circumference of the sun gear 140. Meanwhile, in Embodiment 2, the first holding surface and the second holding surface are surfaces that extend in a direction intersecting the rotation axis direction of the sun gear 140 (more preferably in the perpendicular direction).

Figure 13:
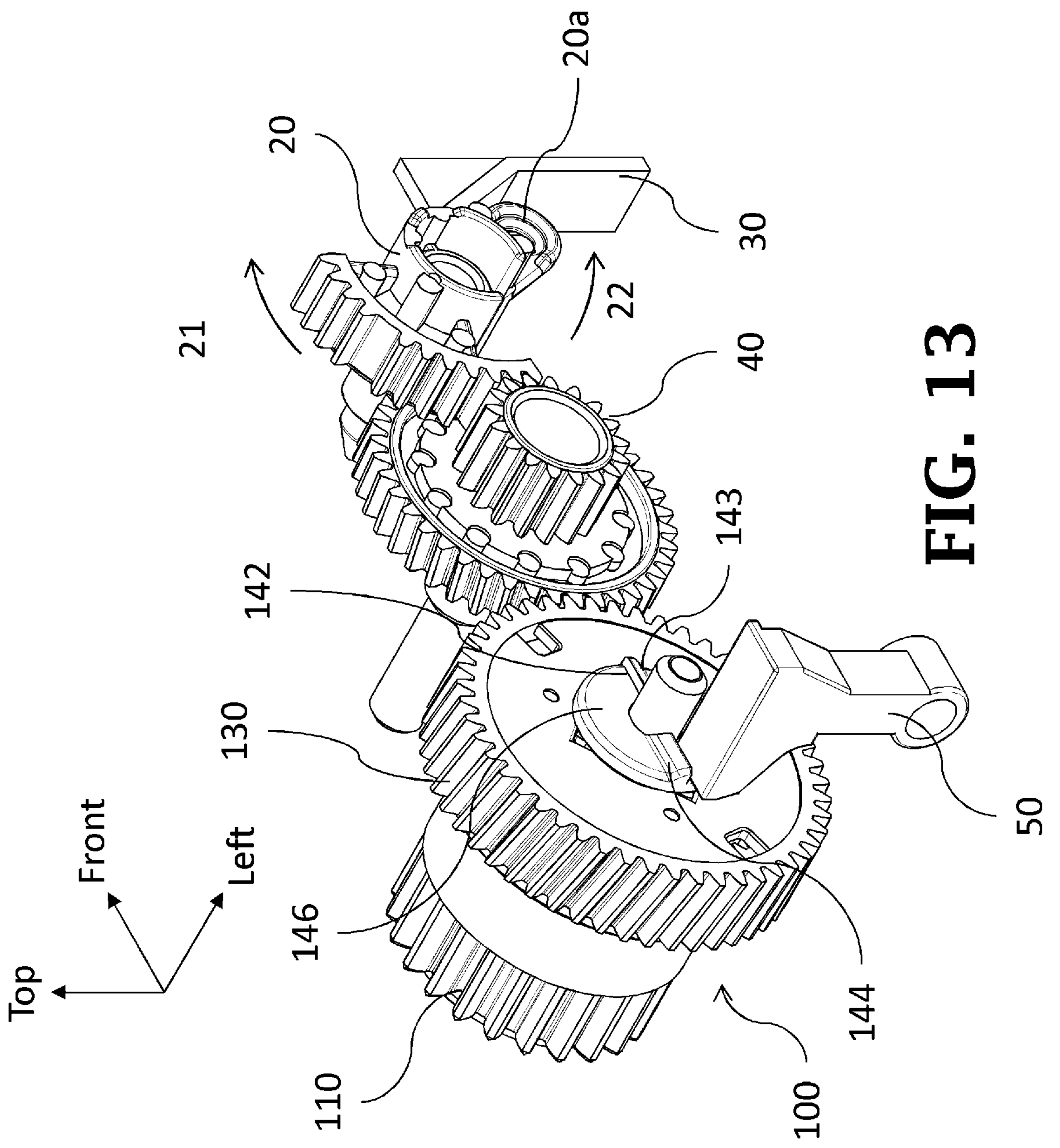
FIG. 13 shows the configuration of a drivetrain according to Embodiment 2.
Figure 14:
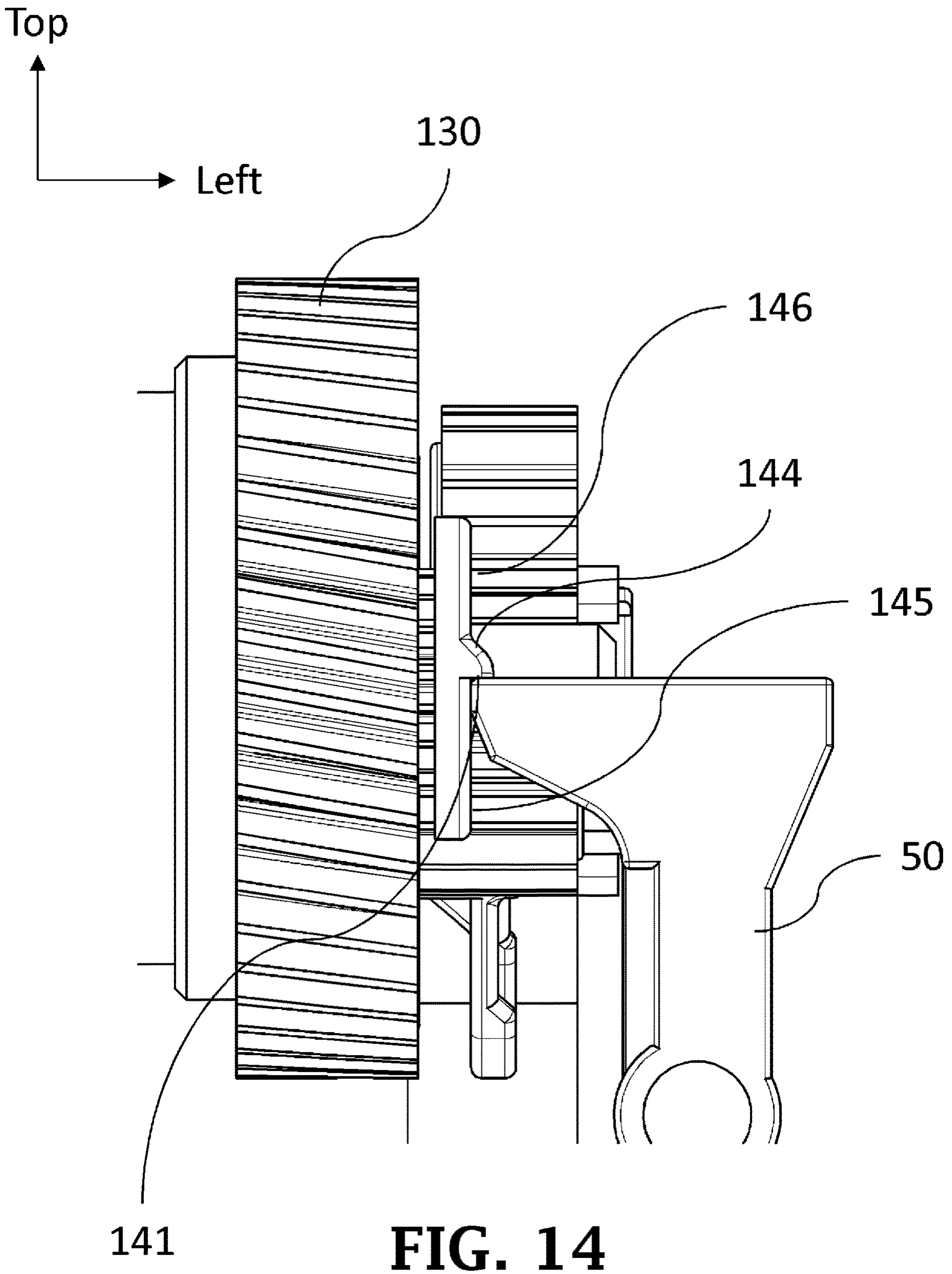
FIG. 14 shows how a sun gear according to Embodiment 2 engages with a stopping member.
Figure 15A:
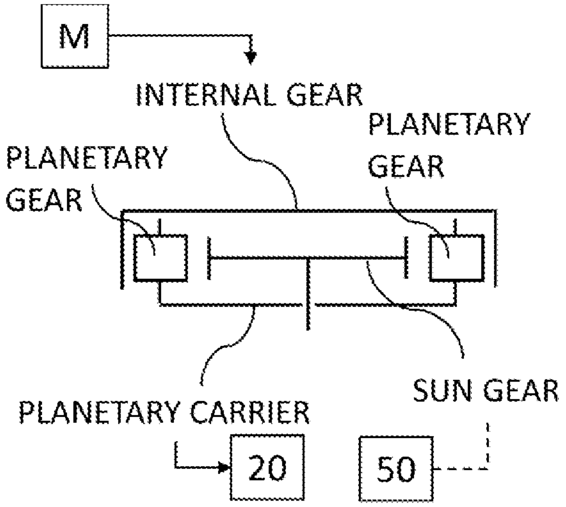
FIGS. 15A to 15F show variations of the relationship between the planetary gear device, the motor, and the driven gear.
Figure 15B:
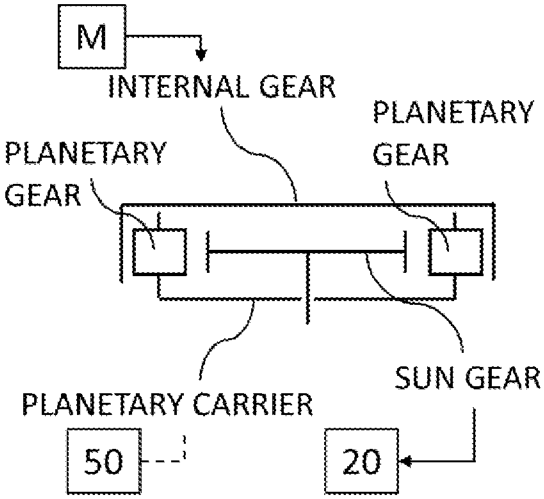
Figure 15C:
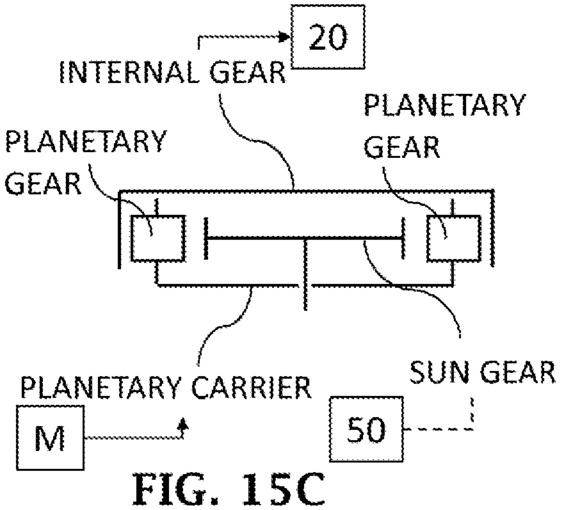
Figure 15D:
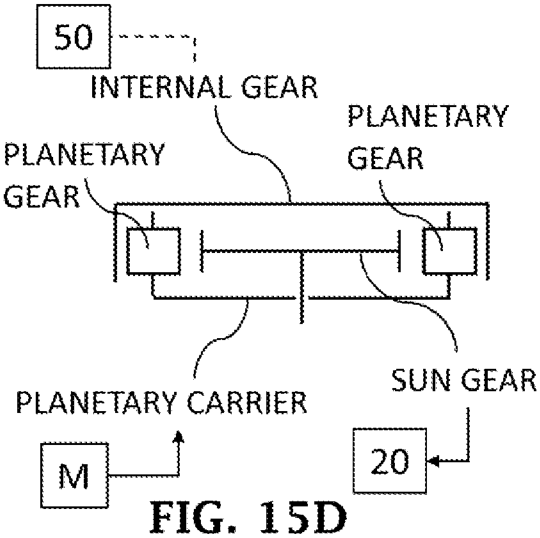
Figure 15E:
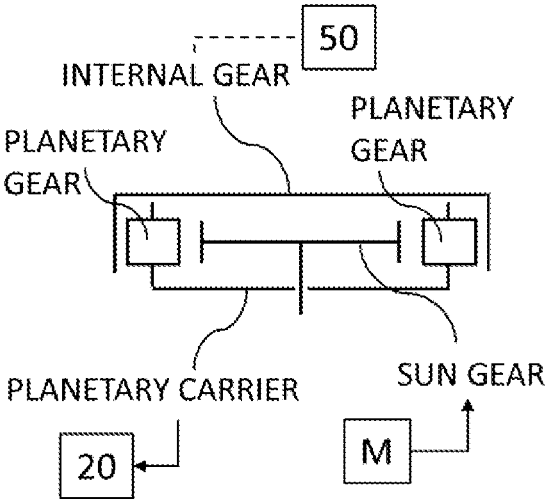
Figure 15F:
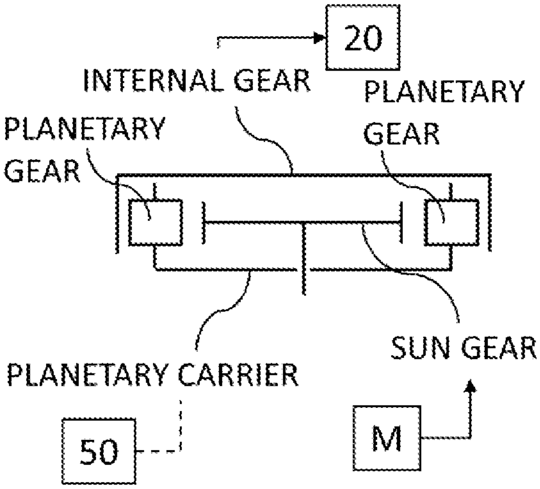

FIG. 13 shows the configuration of the drivetrain that transmits the driving force for releasing the transfer separation, and FIG. 14 shows how the sun gear 140 and the stopper 50 are engaged.

When a driving force is applied to the input gear 110 in the second direction 102, the driving force is transmitted to the driven gear 20 to rotate in the separation direction 22. However, rotation in the separation direction 22 is prevented by the restricting member 30, and the planetary carrier 130 that transmits the driving force assumes a locked state. Therefore, the first planetary gear 120 and the second planetary gear 121 rotate about the first support shaft 131 and the second support shaft 132, respectively, in the spinning direction 122 and drive the sun gear 140 in the first direction 101.

The sun gear 140 is provided with the first inclined portion 143, and when the sun gear 140 rotates in the first direction 101, the stopper 50 is lifted by the first inclined portion 143, comes into contact with the first holding surface 145, and then passes by the second portion 142 to be locked to come into contact with the second inclined portion 144. Where the sun gear 140 rotates further, the stopper is similarly lifted by the second inclined portion 144, comes into contact with the first holding surface 145, passes by the first portion 141 to be locked and comes into contact with the first inclined portion 143 again. Therefore, the sun gear 140 can rotate in the first direction 101 without being restricted by the stopper 50. As a result, even if the driven gear 20 is driven in the separation direction 22 in which the rotation is restricted, the sun gear 140 idles to release the driving force, so that the drivetrain is not locked. That is, it is possible to prevent the drivetrain from being locked and the drivetrain, the shaft, and the like from being damaged.

Here, the case where two portions to be locked, two holding surfaces, and two inclined portions are provided is shown, but such a configuration is not limiting. For example, similar effects can be obtained even if there are one or three or more portions to be locked, holding surfaces, and inclined portions.

Also, although the configuration in which the stopper oscillates has been shown, this configuration is not limiting. For example, similar effects can be obtained even if the locking is by linear motion as long as the biasing direction allows smooth movement by the inclined portion.

In addition, although a shape in which the portion to be locked protrudes from the holding surface to the locking means side in the rotation axis direction of the sun gear has been shown, this shape is not limiting. For example, similar effects can be obtained even in the case of a shape receding to the side opposite to the locking means in the rotation axis direction of the sun gear as long as the engagement with the locking means is possible.

Other Embodiments

In the above-described embodiments, a monochromatic image forming apparatus using one process cartridge was exemplified and explained, but the present invention is not limited to this and can be also applied to a full-color image forming apparatus using a plurality of process cartridges.

In addition, in the above-described embodiments, a printer was exemplified as an image forming apparatus, but the present invention is not limited to this. For example, other image forming apparatuses such as a copying machine and a facsimile machine, or other image forming apparatuses such as a multi-function machine combining these functions may be used. Similar effects can be obtained by applying the present invention to drive transmission mechanisms used in these image forming apparatuses.

FIGS. 15A to 15F show variations of the relationship between the planetary gear device, the motor M, and the driven gear 20.

In each of the above-described embodiments, the sun gear 140 is the portion to be stopped restricted by the stopper 50, the input gear 110 is the input portion to which the drive is input from the motor M, and the planetary carrier 130 is the output portion that transmits the driving force toward the driven gear 20. However, the present invention is not limited to this.

One of the internal gear, sun gear, and planetary carrier of the planetary gear device may be an input portion to which drive is input from the motor M, one of the remaining two may be an output portion that transmits the driving force toward the driven gear 20, and the remaining one may be a portion to be stopped that is restricted by the stopper 50.

In any of these configurations, as in the above embodiments, when the input portion rotates in the first direction, the stopper 50 stops the rotation of the portion to be stopped in the first rotation direction, and the output portion rotates the driven gear 20 in the release direction 21.

Meanwhile, when the input portion rotates in the second direction opposite to the first direction while the rotation of the driven gear 20 in the separation direction (restriction direction) 22 is restricted, the portion to be stopped rotates in the second rotation direction opposite to the first rotation direction. The stopper 50 allows the portion to be stopped to rotate in the second rotation direction.

As described above, according to the embodiments of the present specification, in an image forming apparatus equipped with a drivetrain including a rotating body for which rotation is restricted, damage to the drivetrain can be prevented while maintaining the strength of the drivetrain. That is, in the present description, in a drivetrain including, as an element, a driven gear as a rotating body for which rotation is restricted in one direction, the driven gear is arranged downstream of the drivetrain of the planetary gear mechanism. As a consequence, the strength of the drivetrain is not reduced when the driven gear rotates in the direction that is not restricted, and even if the driven gear receives a rotational force in the restricted direction, the sun gear will rotate instead. As a result, damage to gears, shafts, and the like can be prevented because not load is applied to the elements of the drivetrain. In particular, when the present invention is applied to an image forming apparatus or a multi-function machine, even if the rotating body of the drivetrain is rotated in the direction in which rotation is restricted when attaching or detaching a cartridge or a conveying roller driven by a gear, the effect of preventing attachment/detachment failure due to locking of the drivetrain can be obtained.

According to the present invention, in an image forming apparatus equipped with a drivetrain including a rotating body for which rotation is restricted, damage to the drivetrain can be prevented.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-016353, filed on Feb. 4, 2022, and, Japanese Patent Application No. 2022-186222, filed on Nov. 22, 2022, which are hereby incorporated by reference herein in their entirety.

What is claimed is:

1. An image forming apparatus forming an image on a recording material, the image forming apparatus comprising:

a restricting member;

a driven gear that includes a portion to be restricted capable of coming into contact with the restricting member, wherein rotation of the driven gear in a restriction direction is restricted when the portion to be restricted is in contact with the restricting member;

a planetary gear mechanism that includes an input portion configured to receive a driving force transmitted from a driving source, an output portion configured to transmit the driving force to the driven gear, and a portion to be stopped; and a stopping member that is configured to stop rotation of the portion to be stopped in a first rotation direction, and allow rotation of the portion to be stopped in a second rotation direction opposite to the first rotation direction, wherein when the input portion rotates in a first direction, the stopping member stops rotation of the portion to be stopped in the first rotation direction, and the output portion rotates the driven gear in a release direction opposite to the restriction direction, and when the rotation of the driven gear in the restriction direction is restricted and the input portion rotates in a second direction opposite to the first direction, the portion to be stopped rotates in the second rotation direction.

2. The image forming apparatus according to claim 1, wherein the planetary gear mechanism has an internal gear, a sun gear, a planetary gear that meshes with the internal gear and the sun gear, and a carrier having a support shaft on which the planetary gear is rotatably supported, and one of the internal gear, the sun gear, and the carrier is the input portion, one of the remaining two is the output portion, and the remaining one is the portion to be stopped.

3. The image forming apparatus according to claim 2, wherein the sun gear is the portion to be stopped, the internal gear is the input portion, and the carrier is the output portion.

4. The image forming apparatus according to claim 1, wherein by rotating in the release direction, the driven gear can move to a position where coupling between the driven gear and the planetary gear mechanism is cut off.

5. The image forming apparatus according to claim 1, further comprising:

an apparatus main body; and a cartridge detachably attached to the apparatus main body, wherein the drive source is configured to drive the planetary gear mechanism and the cartridge.

6. The image forming apparatus according to claim 5, wherein the input portion is rotated by attaching and detaching the cartridge to and from the apparatus main body.

7. The image forming apparatus according to claim 1, comprising a portion to be locked, wherein the portion to be stopped is stopped by the stopping member coming into contact with the portion to be locked in a state where the input portion rotates in the first direction.

8. The image forming apparatus according to claim 7, wherein the portion to be locked has a locking surface provided on the portion to be stopped and engaging with the stopping member, the portion to be stopped has a holding surface that is in contact with and slides against the stopping member when the portion to be stopped rotates, and an inclined portion, and the inclined portion includes a portion smoothly connected to the holding surface and inclined from the holding surface, and a portion connected to the holding surface through the locking surface.

9. The image forming apparatus according to claim 8, wherein in the portion where the inclined portion is connected to the holding surface through the locking surface, the holding surface and the surface of the inclined portion are discontinuous.

10. The image forming apparatus according to claim 8, wherein when the portion to be restricted is in contact with the restricting member and the input portion rotates in the second direction, the stopping member moves from a state of being in contact with the holding surface of the portion to be locked to a state of being in contact with the inclined portion, then climbs over the portion to be locked and returns to the state of being in contact with the holding surface.

11. The image forming apparatus according to claim 8, wherein the stopping member is biased by biasing means so as to come into contact with the portion to be stopped.

12. The image forming apparatus according to claim 8, wherein the portion to be locked protrudes outward in a radial direction of the portion to be stopped from the holding surface.

13. The image forming apparatus according to claim 8, wherein the portion to be locked is recessed inward in a radial direction of the portion to be stopped from the holding surface.

14. The image forming apparatus according to claim 8, wherein:

the holding surface is a surface that extends in a direction intersecting a rotation axis direction of the portion to be stopped, and the portion to be locked protrudes from the holding surface toward the stopping member in the rotation axis direction of the portion to be stopped.

15. The image forming apparatus according to claim 8, wherein the holding surface is a surface that extends in a direction intersecting a rotation axis direction of the portion to be stopped, and the portion to be locked is recessed from the holding surface toward a side opposite to the stopping member in the rotation axis direction of the portion to be stopped.

16. The image forming apparatus according to claim 1, wherein the portion to be stopped has an inclined portion that moves the stopping member when the portion to be stopped moves in the second rotation direction.

17. The image forming apparatus according to claim 1, further comprising:

a photosensitive drum on which an electrostatic latent image corresponding to image information is formed;

a developing roller that supplies a developer to the photosensitive drum to form a developer image; and a transfer roller that transfers the developer image onto the recording material.

18. The image forming apparatus according to claim 17, wherein the driven gear switches contact and separation between the transfer roller and the photosensitive drum.

19. The image forming apparatus according to claim 17, wherein the driven gear switches contact and separation between the developing roller and the photosensitive drum.

* * * * *